(12) United States Patent
Notohamiprodjo et al.

(10) Patent No.: US 7,990,740 B1
(45) Date of Patent: Aug. 2, 2011

(54) METHOD AND APPARATUS FOR CONTROLLING POWER FACTOR CORRECTION

(75) Inventors: Hubertus Notohamiprodjo, Union City, CA (US); Jianqing Lin, Pleasanton, CA (US); Hong Liang Zhang, Singapore (SG)

(73) Assignee: Marvell International Ltd., Hamilton (BM)

( * ) Notice: Subject to any disclaimer, the term of this patent is extended or adjusted under 35 U.S.C. 154(b) by 632 days.

(21) Appl. No.: 12/100,345

(22) Filed: Apr. 9, 2008

Related U.S. Application Data

(63) Continuation-in-part of application No. 11/849,158, filed on Aug. 31, 2007, now Pat. No. 7,733,678, which is a continuation-in-part of application No. 10/804,660, filed on Mar. 19, 2004, now Pat. No. 7,266,001.

(60) Provisional application No. 60/910,733, filed on Apr. 9, 2007.

(51) Int. Cl.
*H02M 7/04* (2006.01)

(52) U.S. Cl. .......................... 363/59; 363/89

(58) Field of Classification Search ............... 323/222, 323/282, 283, 284, 285, 351; 363/48, 59, 363/60, 89
See application file for complete search history.

(56) References Cited

U.S. PATENT DOCUMENTS

| | | | |
|---|---|---|---|
| 5,408,403 A | 4/1995 | Nerone et al. | |
| 5,742,151 A | 4/1998 | Hwang | |
| 5,757,635 A | 5/1998 | Seong | |
| 5,804,950 A | 9/1998 | Hwang et al. | |
| 5,905,369 A | 5/1999 | Ishii et al. | |
| 6,043,633 A | 3/2000 | Lev et al. | |
| 6,282,109 B1 | 8/2001 | Fraidlin et al. | |

(Continued)

OTHER PUBLICATIONS http://www.iwatt.com/technology/index.htm, 2 pages, Aug. 20, 2003.

(Continued)

*Primary Examiner* — Adolf Berhane

(57) ABSTRACT

In a method and apparatus for controlling power factor correction (PFC) in mixed operation modes, a frequency of the input voltage is obtained by detecting the zero crossing points of the input voltage. A peak of the input voltage is obtained by detecting input voltage with 90 degree phase. Thus, the present invention predicts the input voltage by its frequency and peak and the characteristic of the sine wave. A digital signal processor computes the duty and frequency of a boost switch, switching the operation mode of the boost converter among continuous mode, critical mode and discontinuous mode according to input voltage or the load. According to another aspect, the operation is switched to critical mode from the average current mode when a zero current is detected before the charging and recharging cycle of the boost switch is finished. Overcurrent protection may be achieved by controlling current in response to detected voltage to provide a substantially constant power level. The overcurrent protection may be adaptive in nature. In this aspect, an adaptive driver for a PFC controller reduces the slew rate of signals over the boost switch of the PFC controller. The adaptive driver may have a group of transistors which may be divided into a plurality of branches. The charging current through the boost switch may be increased by turning on an increasing number of branches until the voltage over the switch exceeds a reference voltage, and this may determine the number of branches to drive the boost switch during normal operation.

24 Claims, 22 Drawing Sheets

U.S. PATENT DOCUMENTS

| | | |
|---|---|---|
| 6,344,986 B1 | 2/2002 | Jain et al. |
| 6,469,917 B1 | 10/2002 | Ben-Yaakov |
| 6,504,132 B1 | 1/2003 | Church |
| 6,556,462 B1 | 4/2003 | Steigerwald et al. |
| 6,703,848 B2 * | 3/2004 | Cho .............................. 324/678 |
| 6,831,449 B2 | 12/2004 | Nishida et al. |
| 6,912,142 B2 | 6/2005 | Keim et al. |
| 7,019,720 B2 * | 3/2006 | LeChevalier ................... 345/82 |
| 7,266,001 B1 | 9/2007 | Notohamiprodjo et al. |
| 7,391,631 B2 | 6/2008 | Shimada |
| 7,417,879 B2 | 8/2008 | Sawtell |
| 7,706,151 B2 * | 4/2010 | Neidorff et al. .................... 363/9 |
| 7,733,678 B1 * | 6/2010 | Notohamiprodjo et al. ..... 363/89 |
| 2002/0089866 A1 | 7/2002 | Keim et al. |
| 2004/0047166 A1 | 3/2004 | Lopez-Santillana et al. |
| 2007/0058402 A1 | 3/2007 | Shekhawat et al. |
| 2008/0084721 A1 | 4/2008 | Miramonti et al. |

OTHER PUBLICATIONS

Bindra, Ashok, "Power Supply Controller Keeps Efficiency High Across All Loads," Electronic Design, Dec. 3, 2001, Cover Story.

* cited by examiner

METHOD AND APPARATUS FOR CONTROLLING POWER FACTOR CORRECTION

CROSS-REFERENCE TO RELATED APPLICATION

This application claims the benefit of priority to previously filed U.S. provisional patent application Ser. No. 60/910,733, filed Apr. 9, 2007, entitled Adaptive Driver for Power Factor Correction (PFC) Controller. That provisional application is hereby incorporated by reference in its entirety.

This application also is a continuation-in-part of U.S. application Ser. No. 11/849,158, filed Aug. 31, 2007, which is a continuation-in-part of U.S. application Ser. No. 10/804,660, filed Mar. 19, 2004, now U.S. Pat. No. 7,266,001. These also are incorporated by reference in their entirety.

BACKGROUND OF THE INVENTION

1. Field of the Invention

The present invention relates to power factor correction (PFC), and more specifically to multiple mode power factor correction, and to drivers for PFC controllers.

2. Description of Related Art

An electrical load may appear to a power supply as a resistive impedance, a capacitive impedance, an inductive impedance, or a combination thereof. When the current is in phase with or at least very close to being in phase with the voltage, the power factor is said to be good. When an electrical load is purely resistive, the current passing to the load is proportional to the voltage crossing the load. The power factor of such an electrical load is close to one. The power factor is less than one in all other situations. If an electrical load is not purely resistive, it may introduce noise into the power line and may increase power losses through transmission lines. To reduce the noise to the power line caused by electrical loads, power supplies with an electrical power output above 30 watts may be required to have power factor corrections, so as to shape the input current waveform to follow the input voltage waveform. Power companies may require their customers to maintain their power factors above a specified amount, e.g., 0.90 or higher.

Boost converters are used for power factor correction. FIG. 1 shows a block diagram of one example of a boost converter. A capacitor 101 filters input current ripple. A four-way rectifier 102 rectifies an input voltage $V_{in}$. When a boost switch 103 is closed, an operating cycle starts. The power source $V_{in}$ charges a boost inductor 104 via an input current $I_{1n}$, and energy is stored in the boost inductor 104. When $I_{1n}$ reaches a value determined by a controller 105, the controller 105 outputs a signal to open the boost switch 103, and the inductor 104 discharges via a load 106. When the boost switch 103 has been opened for a period of time determined by the controller 105, or the input current $I_{1n}$ falls to a value determined by the controller 105, the controller 105 outputs a signal to close the boost switch 103, and the next operation cycle starts. A boost diode 107 prevents current from flowing back to the boost inductor 104 from the load 106. A capacitor 108 filters high frequency noises of the rectified $V_{in}$ and a capacitor 109 removes ripples in the output voltage $V_{out}$.

Conventional boost converters use one of three operation modes: continuous mode (also called average current mode), discontinuous mode, or critical mode, but cannot switch among them.

FIG. 2A shows a block diagram of a conventional power factor correction controller for the continuous mode. A power factor correction controller has two tasks. The first is to regulate the output voltage $V_{out}$ to keep it stable. The second is to regulate the input current $I_{1n}$ to make it follow the waveform of the input voltage $V_{in}$, mimicking that the load is purely resistive. As shown, a subtractor 201 subtracts a reference voltage $V_{ref}$ from the output voltage $V_{out}$ to obtain a voltage error $V_{err}$, which is then amplified by a voltage amplifier 202. The subtractor 201 and the voltage amplifier 202 are used to regulate $V_{out}$ to keep the output stable.

The input voltage is a sine wave. To make a load appear as a purely resistive load, the input current needs to be regulated as a sine wave in the same phase as the input voltage. A multiplier 203 multiplies the amplified $V_{err}$ from the voltage amplifier 202; the rectified input voltage $V_{inrec}$; and the normalized root mean square value of the rectified input voltage $V_{inrec}$ from a low pass filter 204 and a normalizer 205. The output of the multiplier 203 is a factor $C_{ref}$. A subtractor 206 subtracts the factor $C_{ref}$ from the input current $I_{1n}$ of the boost converter, obtaining a current error $C_{err}$, which is amplified by an amplifier 207 and is then used to control a pulse width modulator (PWM) 208.

The period, $T_s$, of the charging and discharging cycle in the continuous mode is fixed. The charging time is determined by the amplified current error $C_{eaout}$. Thus, the discharging time is $T_s$ minus the charging time. The resulting switch voltage $V_{sw}$ is then used to control the boost switch 103 shown in FIG. 1.

FIG. 2B illustrates the voltage waveform and current waveform of a conventional boost converter in continuous mode. The current in continuous mode never goes to zero, except at the edges. The benefit of running continuous mode is lower ripple current, so that the controller only needs a small input filter. However, at a given power level, if the continuous mode is used, the size of the inductor must be large in the full cycle.

FIG. 3A shows a block diagram of a conventional power factor correction controller for the critical mode. Similarly to the power factor correction controller shown in FIG. 2A, the power factor correction controller for the critical mode obtains an amplified voltage error by a subtractor 301 and a voltage amplifier 302. A zero current detector 303 finds zero current points in the input current $I_{1n}$. A PWM 308 is coupled to the outputs of the voltage amplifier 302 and the zero current detector 303. In the critical mode, the charging time is fixed and is determined by the voltage amplifier 302, and the boost inductor 104 keeps discharging until a zero current point is met.

FIG. 3B illustrates the voltage waveform and current waveform of a conventional boost converter for the critical mode. As shown, the boost inductor keeps discharging until a zero current point is met. When the critical mode is used, the size of the inductor can be small, but the ripple current is very high, thus requiring a large input filter.

FIG. 4 illustrates the voltage waveform and current waveform of a conventional boost converter in discontinuous mode. As shown, the input current $I_{1n}$ remains off for a certain time interval between each charging and discharging cycle. The discontinuous mode also has high ripple current and needs a large input filter.

Another disadvantage of conventional boost converters is that their current harmonic distortions start to increase when the load is lowered.

A further disadvantage of the conventional boost converters is that their responses in certain frequency bands are very slow. If they respond too fast, there will be large spikes.

Therefore, it would be advantageous to provide a method and apparatus for controlling the boost converters in multiple modes during power factor correction, so as to keep both the boost inductor and the input filter small.

Power factor correction, or PFC, may be used to counteract the undesirable effects of electric loads which create a power factor that is less than 1. FIG. 5 illustrates a block diagram of an existing PFC controller. The PFC controller may be used to convert an AC signal to a high voltage DC signal $V_{out}$, and at the same time, maintain the power factor of the load as close to 1 as possible. As shown, an AC input voltage $V_{in}$ may pass through an electromagnetic interference (EMI) filter and input rectifier stage 501 first and become a half sine wave. A pulse-width modulation (PWM) controller 502 may output an SW signal to control a boost output loop. The boost output loop may include a boost switch 503, a boost diode 504 and an output electrolytic capacitor 505. The boost switch 503 may be, e.g., an NMOSFET.

When the boost switch 503 is closed, the power source $V_{in}$ may charge a boost inductor 506 via an input current $I_{1n}$, and energy may be stored in the boost inductor 506. When $I_{1n}$ reaches a certain value, the PWM controller 502 may open the boost switch 503 and the boost inductor 506 may discharge via a load 507. When the boost switch 503 has been opened for a certain period of time or the input current $I_{1n}$ falls below a certain value, the PWM controller 502 may close the boost switch 503, and the next operation cycle may start. The boost diode 504 may prevent current from flowing back to the boost inductor 506 from the load 507, a capacitor 509 may remove ripples in the output voltage $V_{out}$, and a capacitor 508 may filter high frequency noises of the rectified $V_{in}$.

In the PFC controller shown in FIG. 5, the output signal SW of the PWM controller 502 may directly drive gate of the NMOSFET 503 to 250 W. In high frequency applications, the SW signal may turn on and off very fast, and the sharp edge gating may cause a very high di/dt switching current and consequently EMI effect in the boost output loop. In addition, parasitic inductance in the boost output loop may cause high voltage oscillation across the boost switch 503 with the risk of avalanche breakdown or power loss.

Therefore, it would be desirable to provide an apparatus to control the SW pin slew rate, so as to maintain a good di/dt and avoid spike current oscillations in the PFC controller.

SUMMARY OF THE INVENTION

In view of the foregoing, it is an object of the present invention to provide a power factor correction controller, which dynamically changes operation mode of a boost converter during a half cycle of the voltage, thus gaining the benefit of small size inductor, low harmonic distortion, and small ripple current. A digital signal processor calculates the duty cycle and frequency of the boost switch. In one embodiment, when the phase of the voltage is roughly between 45 degrees and 135 degrees, the voltage is high, and the controller forces the boost converter to operate in continuous mode by adjusting the frequency and duty cycle of the boost switch. Beyond this range, the controller forces the boost converter to operate in critical or discontinuous mode.

It is another object of the present invention to provide a controller for power factor correction for a variable load. The controller senses the input current continuously and switches the operation mode automatically according to the load to improve the response. The operation is in continuous mode when the load is high, and in the critical mode when the load is reduced.

It is another object of the present invention to provide a controller for power factor correction, which switches operation mode from average current mode to critical mode when a zero current is detected before the charging and discharging cycle is finished.

It is another object of the present invention to provide an adaptive driver for a power factor correction controller.

BRIEF DESCRIPTION OF THE DRAWINGS

The present invention is described herein with reference to the accompanying drawings, similar reference numbers being used to indicate functionally similar elements.

DETAILED DESCRIPTION OF EMBODIMENTS

Objects and advantages of the present invention will become apparent from the following detailed description.

Figure 1:
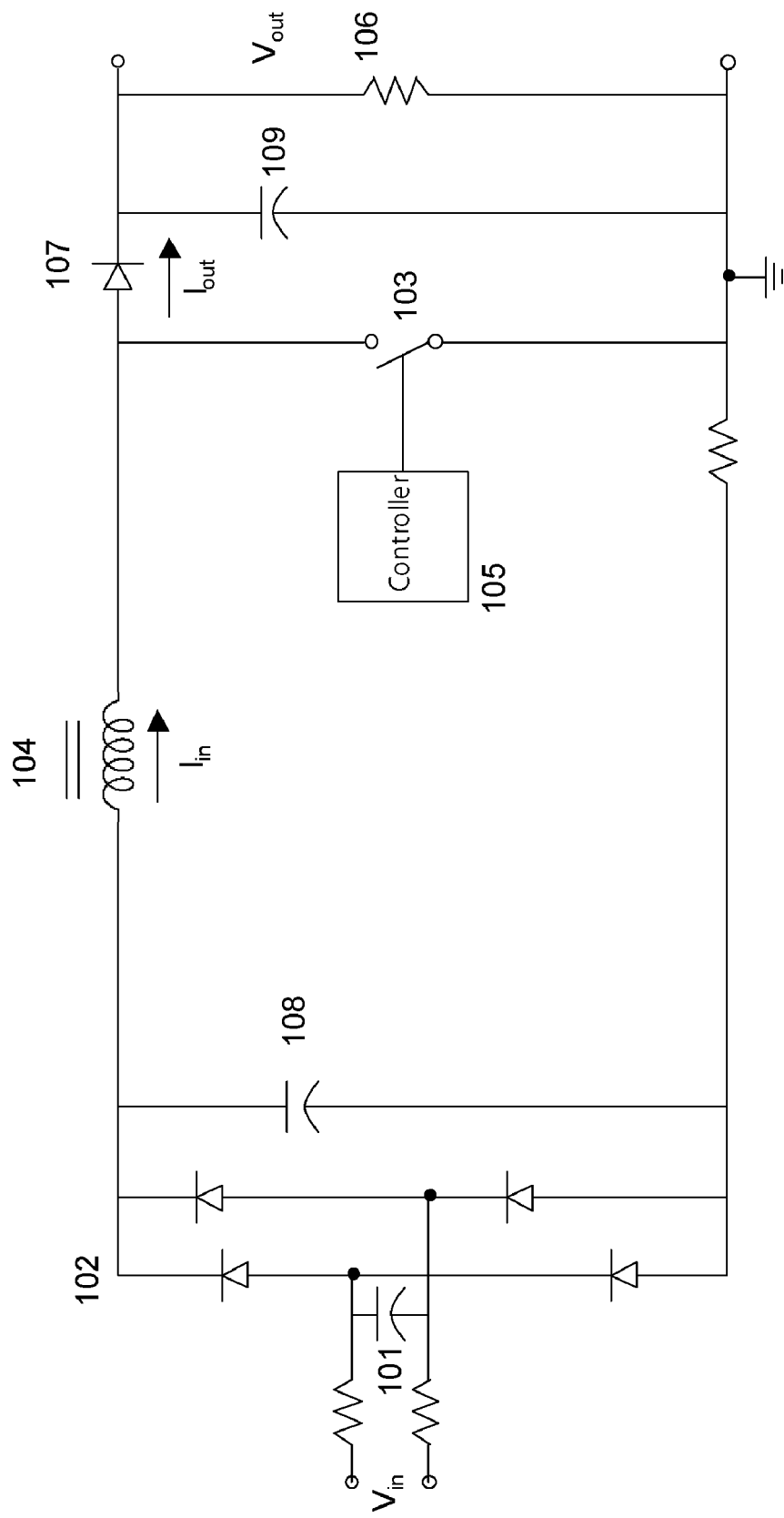
FIG. 1 shows a block diagram of one example of a boost converter.
Figure 6A:
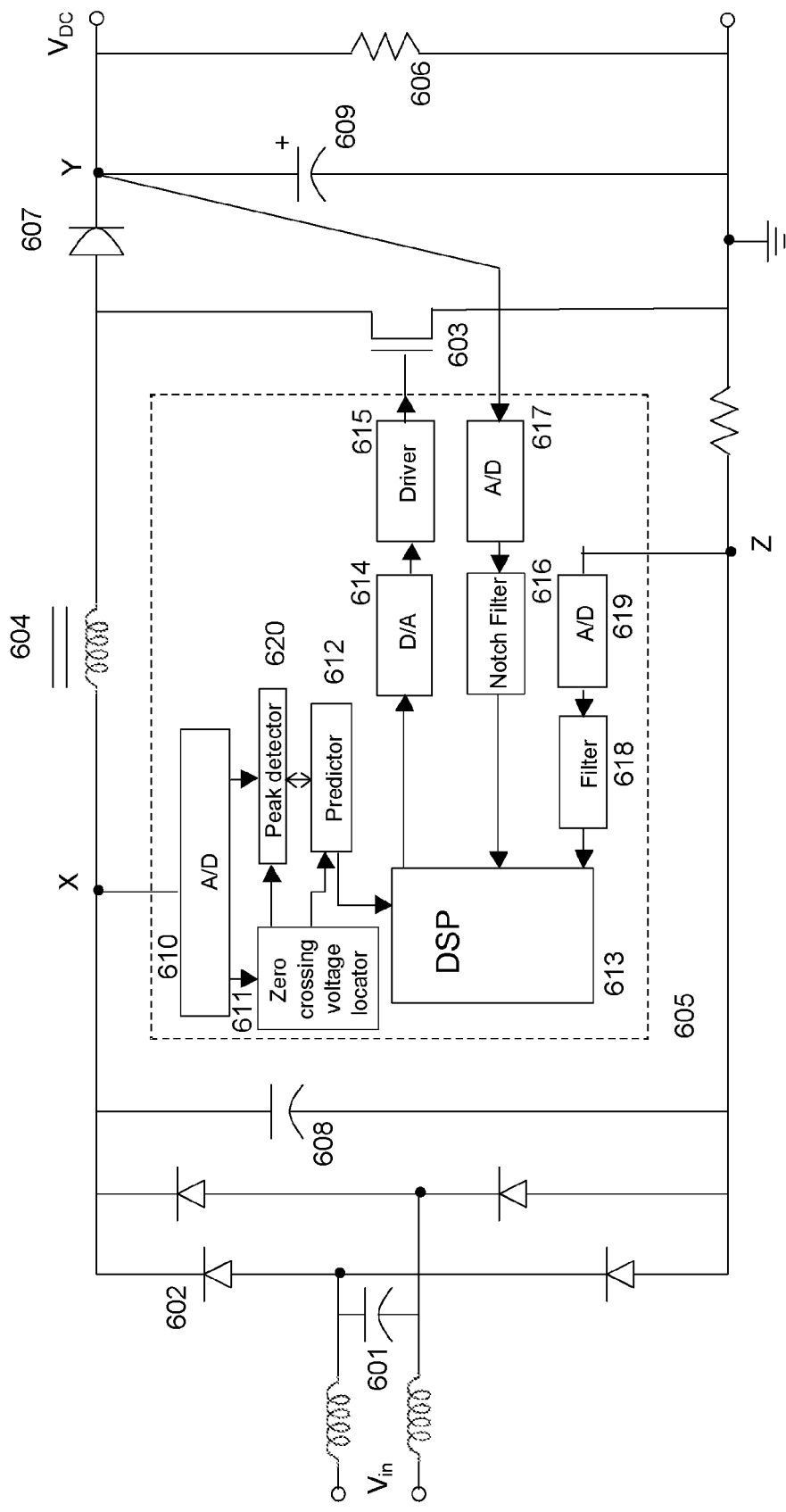
FIG. 6A shows a block diagram of an apparatus for power factor correction, employing a multiple mode controller according to one embodiment of the present invention.

FIG. 6A shows a block diagram of an apparatus for power factor correction, employing a multiple mode controller according to one embodiment of the present invention. The controller 605 shown in FIG. 6A can dynamically switch the operation mode of the boost converter among continuous mode, critical mode, and discontinuous mode. The controller 605 is a DSP (Digital Signal Processor). In one embodiment, the controller 605 is an ASIC (Application Specific Integrated Circuit). Other embodiments for controller 605, including microprocessors and other hardware/software/firmware implementation will be apparent to ordinarily skilled artisans. Other parts of the boost converter shown in FIG. 6A are similar to those shown in FIG. 1.

As shown, the controller 605 obtains inputs at points X, Y, and Z. The controller 605 senses a zero crossing voltage at point X; senses a voltage at point Y to maintain the output voltage stable; and senses the current at point Z to predict the load behavior.

The sensed voltage signals at point X are converted to digital signals by an A/D converter 610. A zero crossing voltage locator 611 finds out zero crossing voltages, and output them to a predictor 612 and a peak detector 620. The predictor 612 determines the frequency of the input voltage and the locations of the point with 90 degree phase. A peak detector 620 obtains the voltage magnitude of this point, the peak voltage, and sends the peak voltage to the predictor 612.

In one embodiment, the predictor 612 has a predictive look up table. One form of the predictive look up table, in which D represents duty cycle, is as follows.

| Frequency | Vin | Equations |
|---|---|---|
| 50 Hz | 220 V | $D = 1 - \dfrac{220 \sin\theta}{V_{out}}$ |
| 50 Hz | 230 V | $D = 1 - \dfrac{230 \sin\theta}{V_{out}}$ |
| 50 Hz | 240 V | $D = 1 - \dfrac{240 \sin\theta}{V_{out}}$ |
| 60 Hz | 120 V | $D = 1 - \dfrac{120 \sin\theta}{V_{out}}$ |
| 60 Hz | 277 V | $D = 1 - \dfrac{227 \sin\theta}{V_{out}}$ |

Thus, instead of continuously following and sampling the input voltage signal, as the conventional power factor correction controller does, the controller 605 only detects the zero crossing points and the peak voltage magnitude. The predictor 612 predicts the waveform of the input voltage according to the zero crossing points, the peak voltage, and the characteristics of the sine wave. The predictor 612 then outputs to the DSP 613 a set of equations corresponding to the waveform of the input voltage signal.

The DSP 613 also receives a voltage signal from point Y via an A/D converter 617 and a notch filter 616. The notch filter 616 removes harmonic ripples of the input voltage feeding into the loop. In this embodiment, the frequency of the input voltage is 60 Hz, and the notch filter 616 removes a narrow band of frequencies around 120 Hz, or twice the frequency of the input signal.

The DSP 616 further receives a current signal from point Z via an A/D converter 619 and a filter 618. The DSP 613 then calculates the duty and frequency of the boost switch according to the equations from the predictor 612, the voltage signal from point Y, and the current signal from point Z.

The main relations in the boost converters are as follows:

$$I_A = i\_ideal/(D1+D2) + v\_rail*D1*Tsw/(2*L_b);$$

$$I_B = i\_ideal/(D1+D2) - v\_rail*D1*Tsw/(2*L_b);\text{ and}$$

$$V_{out}/v\_rail = (D1+D2)/D2, \quad (1)$$

wherein $I_A$ refers to the maximum charging current;
$I_B$ refers to the minimum discharging current;
i_ideal refers to the current making the load 606 appear as a purely resistive load, and can be calculated from the input voltage predicted by the predictor 612 and the impedance of the load 606;
D1 refers to the turn on time of the boost switch 603;
D2 refers to the turn on time of the boost diode 607;
v_rail refers to the rectified $V_{in}$, or the voltage at point X;
$T_{sw}$ refers to the period of the boost switch 603; and
$L_b$ refers to impedance of the boost inductor 604.

For continuous mode, D1+D2=1. Thus, $I_A$, $I_B$, D1 and D2 can be calculated from equation (1).

For discontinuous mode, $I_B$=0, and $D_{gap}$=1−D1−D2. Thus, $I_A$, D1 and D2 can be obtained from equation (1).

In one embodiment, the DSP 613 uses the following coefficient matrix to calculate a duty cycle of the boost switch 603:

$$A = [L_b, -L_b, -v\_rail(i)*T_{sw}(k); L_b, -L_b, (v_o(i) - v\_rail(i))*T_{sw}(k), 1, 1, 0];$$

$$B = [0; (v_o(i) - v\_rail(i))*T_{sw}(k); 2*i\_ideal(i)];$$

$$X = A \backslash B, \quad (2)$$

wherein, $$v\_rail(i) = 2 + abs(V_{in}*\sin(wt(i)));$$

$$V_m = \text{sqrt}(2)*V_{in\_low};$$

$$wt(i) = i*Del(k);$$

$$Del(k) = 20*pi/Fsw(k);$$

$$Fsw(k) = 1/Tsw(k);$$

$$Tsw(k) = [4*L_b/(\text{effcy}*V_m^2*D1\_pk)*(P_{o\_rated} - P_{out}(k)) + 1/Fsw\_mx];$$

$$v_o(i) = V_{out} + (v_{o\_ripp}/2)*\sin(2*wt(i));$$

$$i\_ideal(i) = 0.1 + abs(I_m(k)*\sin(wt(i)));$$

$$P_{out}(k) = kk*P_{o\_rated};$$

$$k = 1{:}10$$

$$kk = (11-k)/10.$$

If x(2)>0, then $$I_A(i) = x(1);$$

$$I_B(i) = x(2);$$

$$D1(i) = x(3);\text{ and}$$

$$D2(i) = 1 - D1(i).$$

By solving the coefficient matrix (2), $I_A$, $I_B$, D1 and D2 can be obtained. If $0.2<D1(i)<1$, $D2(i)=1-D1(i)$. In this situation, the load is large, and the boost converter operates in continuous mode.

If $0<D1(i)<0.2$, then $$I_B(i)=0;$$

$$I_A(i)=2*i\_ideal(i);$$

$$D1(i)=L_b*(I_A(i)-I_B(i))*F_{sw}(k)/v\_rail(i); \text{ and}$$

$$D2(i)=1-D1(i).$$

In this situation, the boost converter operates in critical mode.

If $x(2) \leqq 0$, and $(pi/6>wt(i)|wt(i)>5*pi/6)$, or $x(2))\leqq 0$, and $(pi/6<wt(i)<5*pi/6)$, then $$I_B(i)=0;$$

$$D1(i)=0.5,$$

$$D2(i)=L_b*(I_A(i)-I_B(i)*F_{sw}(k)/v_o(i)-v\_rail(i)); \text{ and}$$

$$D_{gap}(i)=1-D1(i)-D2(i)$$

In this situation, the boost converter operates in discontinuous mode.

The DSP 613 calculates the charging current, the discharging current, the boost switch turn on time, and the boost diode turn on time according to the rectified input voltage, the output voltage, and the load behavior, and adjusts the duty cycle and frequency of the gate voltage $V_{sw}$ of the boost switch 603 accordingly. The DSP 613 then sends the gate voltage via an D/A converter 614 and a driver 615. Consequently, the waveform of the input current is made to follow the waveform of the input voltage, even when the load is variable.

Figure 6B:
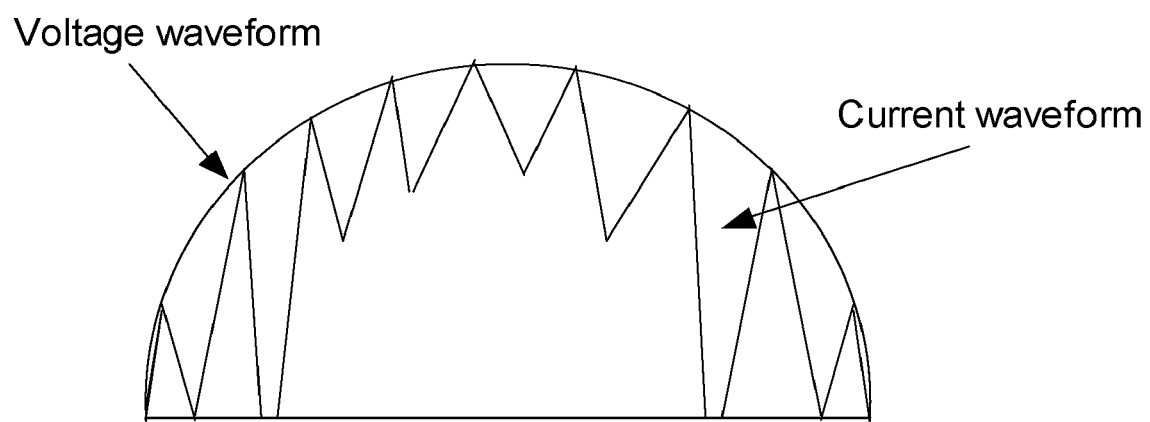
FIG. 6B illustrates the voltage waveform and current waveform of a multiple mode boost converter according to one embodiment of the present invention.

FIG. 6B illustrates the voltage waveform and current waveform of a multiple mode boost converter according to one embodiment of the present invention. As shown, the boost converter operates in continuous mode at the peak of the input voltage, in discontinuous mode at the beginning and end of the half input voltage cycle, and in critical mode during the transition of these two modes.

Figure 7C:
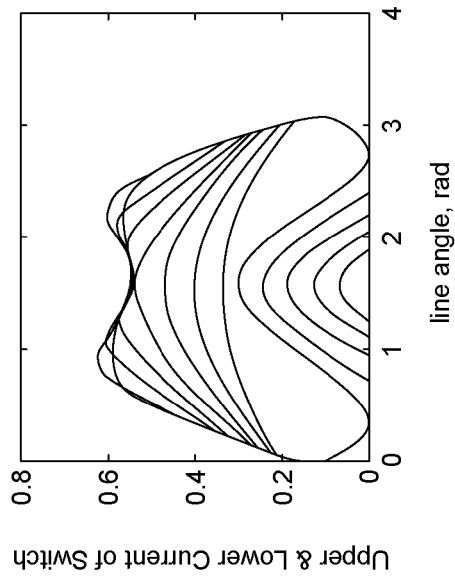
FIGS. 7A-D illustrate plots of variables of a boost converter employing a controller according to one embodiment of the present invention.
Figure 7D:
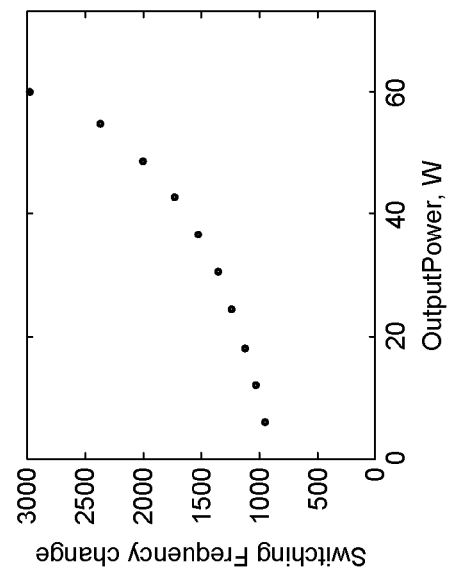
Figure 7A:
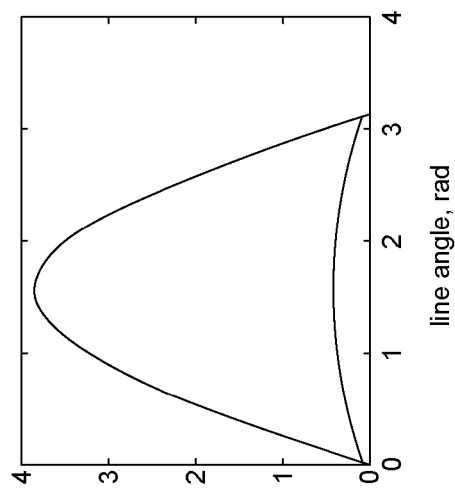
Figure 7B:
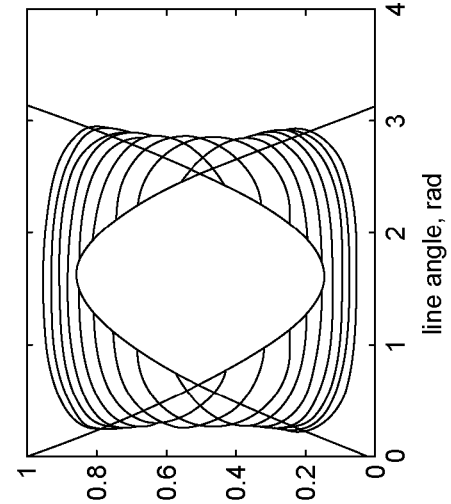
Figure 8C:
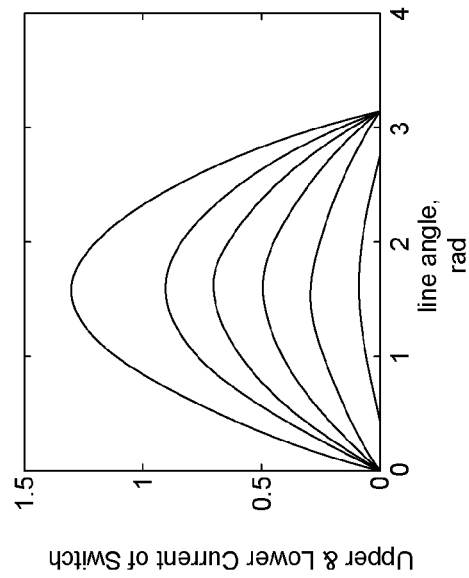
FIGS. 8A-D illustrate plots of variables of a boost converter employing a conventional controller.
Figure 8D:
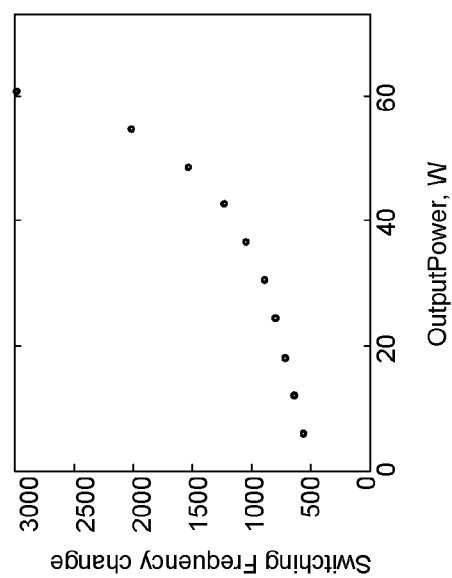
Figure 8A:
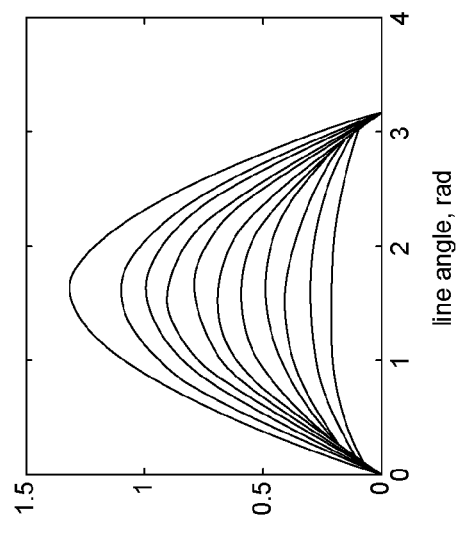
Figure 8B:
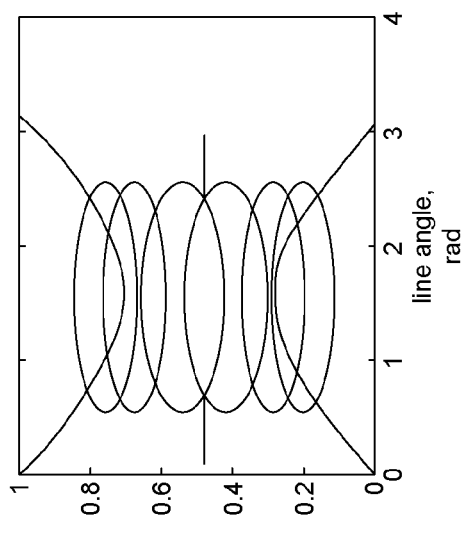

FIGS. 7A-D illustrate plots of variables of the multiple mode boost converter according to one embodiment of the present invention. FIGS. 7A-C indicate the change of rectified rail voltage, duty cycle, and upper and lower current of switch with respect to line angle in radian, and FIG. 7D indicates the change of switching frequency with respect to output power.

FIGS. 8A-D illustrate plots of variables of a conventional converter. Similarly, FIGS. 8A-C indicate the change of rectified rail voltage, duty cycle, and upper and lower current of switch with respect to line angle in radian, and FIG. 8D indicates the change of switching frequency with respect to output power.

Figure 9A:
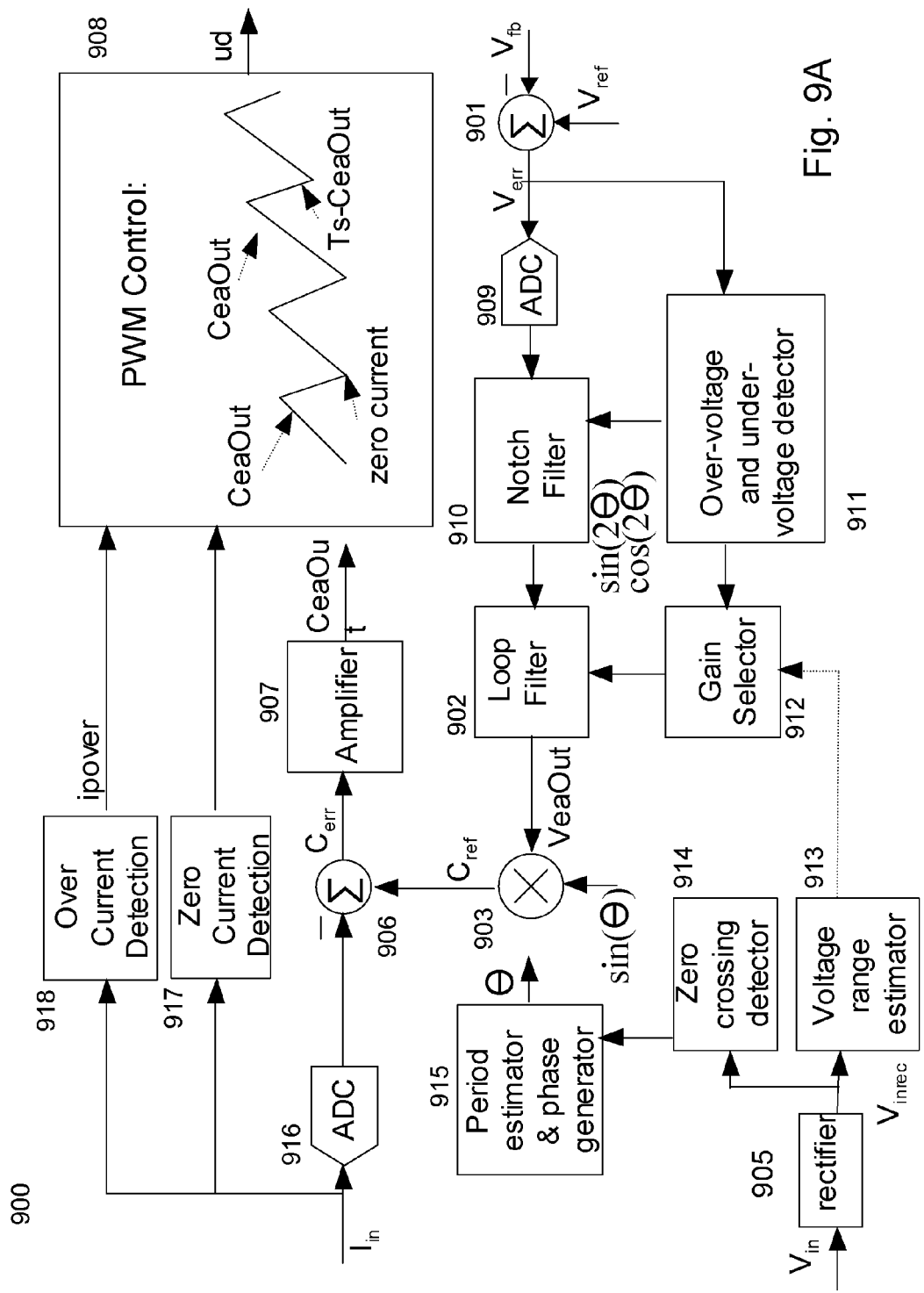
FIG. 9A shows a block diagram of a power factor correction controller for multiple mode operation according to another embodiment of the present invention.

FIG. 9A shows a block diagram of a multiple mode power factor correction controller according to another embodiment of the present invention. A controller 900 adjusts the operation mode of a boost converter according to the loading. When the loading is high, the controller 900 controls the boost converter to operate in the continuous mode. When the loading is low, the controller 900 changes the operation mode of the boost converter to the critical mode.

Figure 2A:
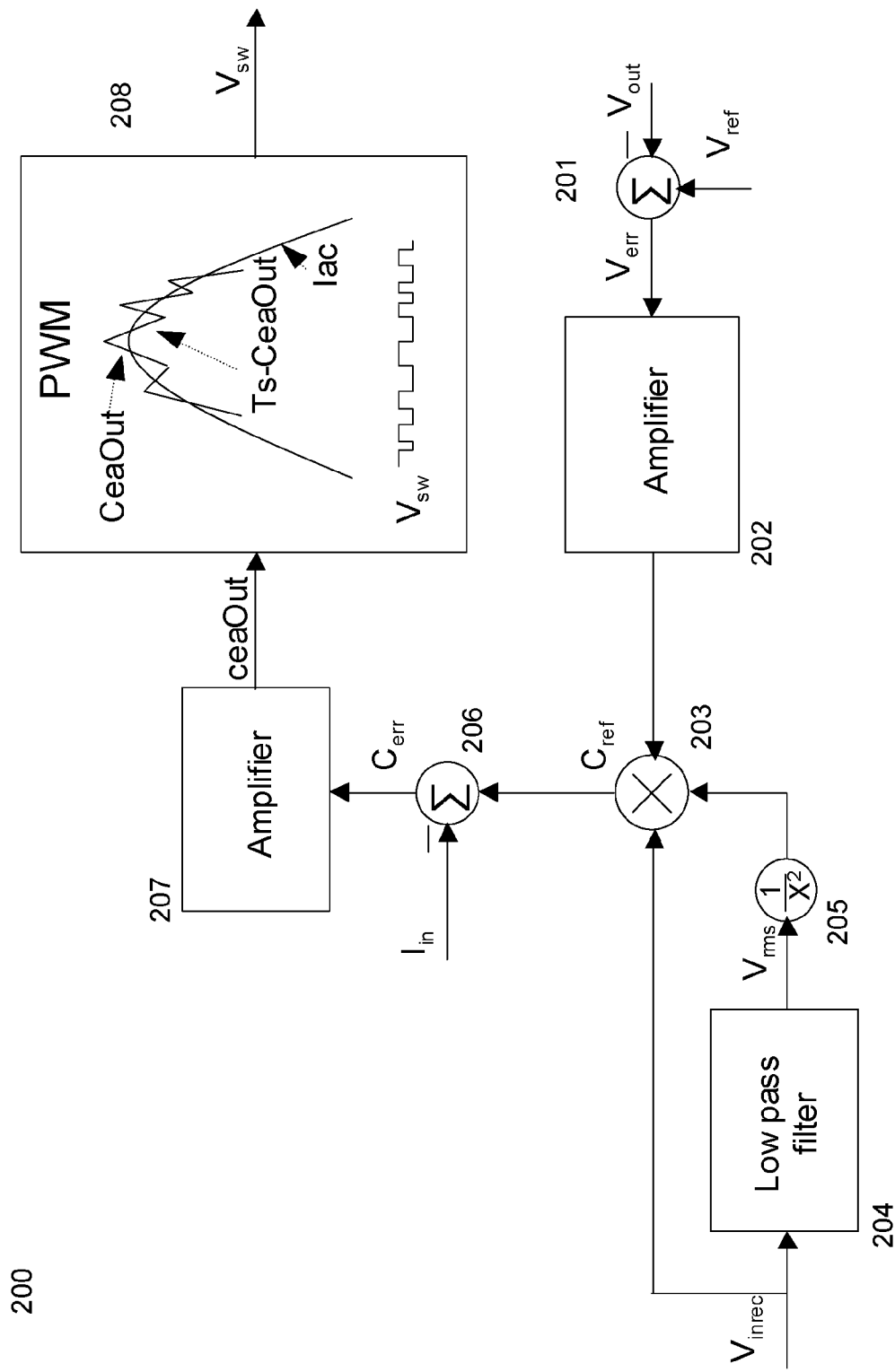
FIG. 2A shows a block diagram of a conventional power factor correction controller for continuous mode.
Figure 2B:
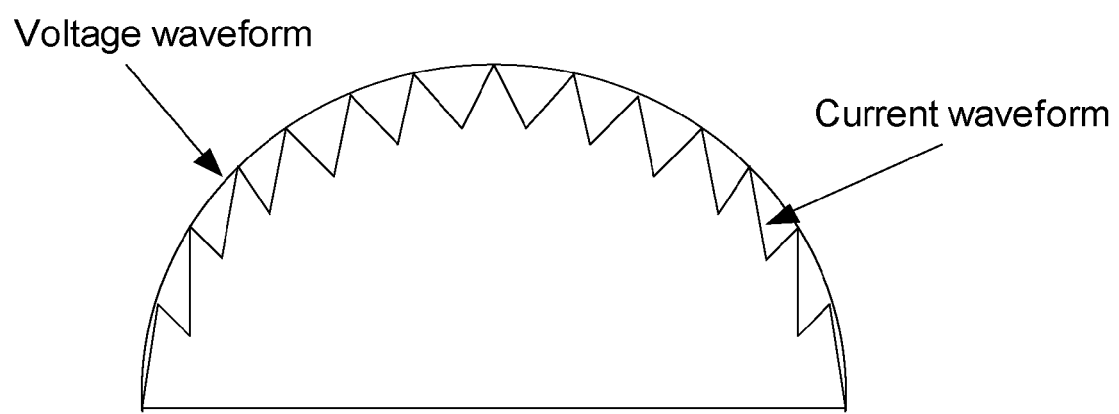
FIG. 2B illustrates the voltage waveform and current waveform of a conventional boost converter in continuous mode.
Figure 3A:
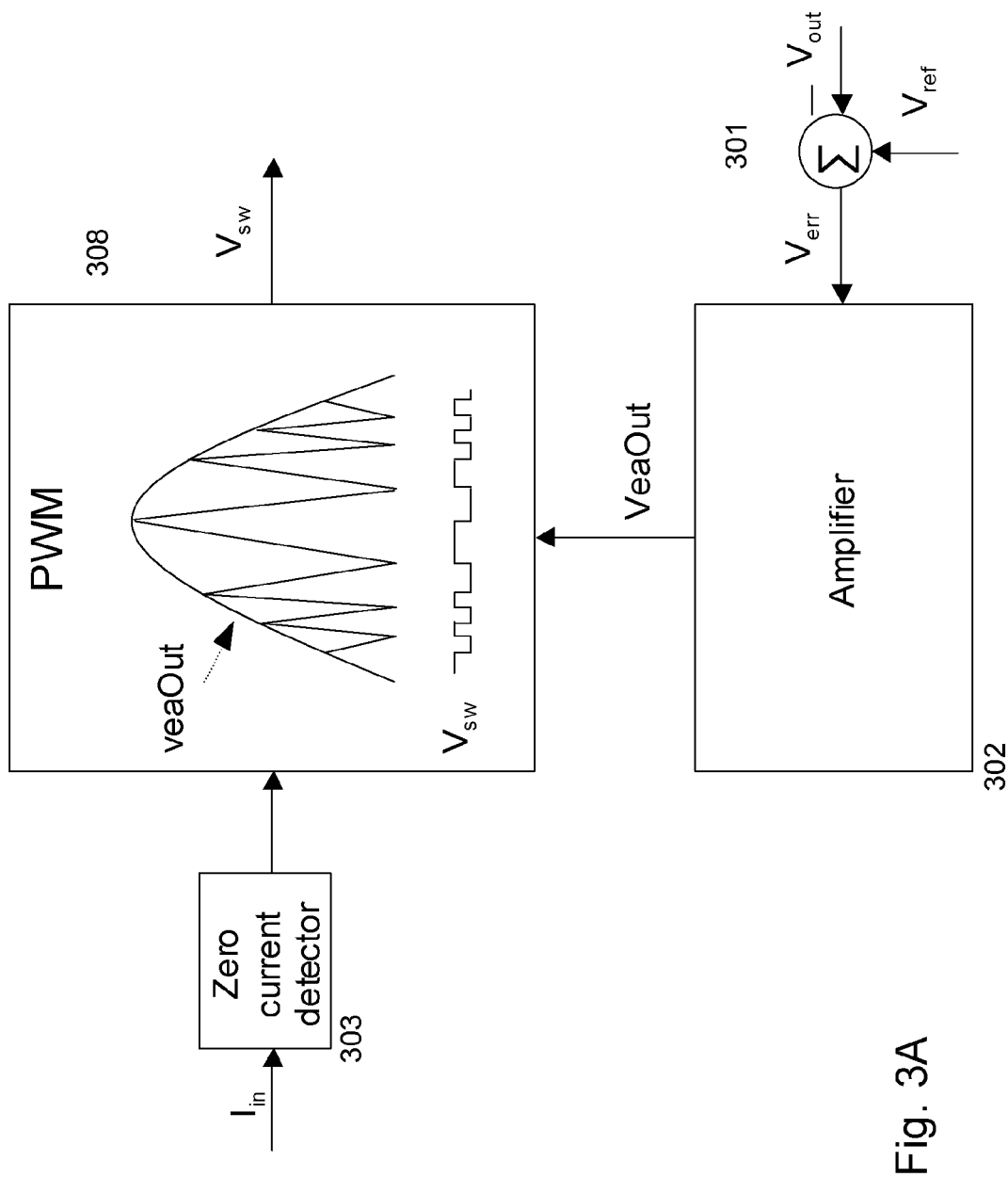
FIG. 3A shows a block diagram of a conventional power factor correction controller for critical mode.
Figure 3B:
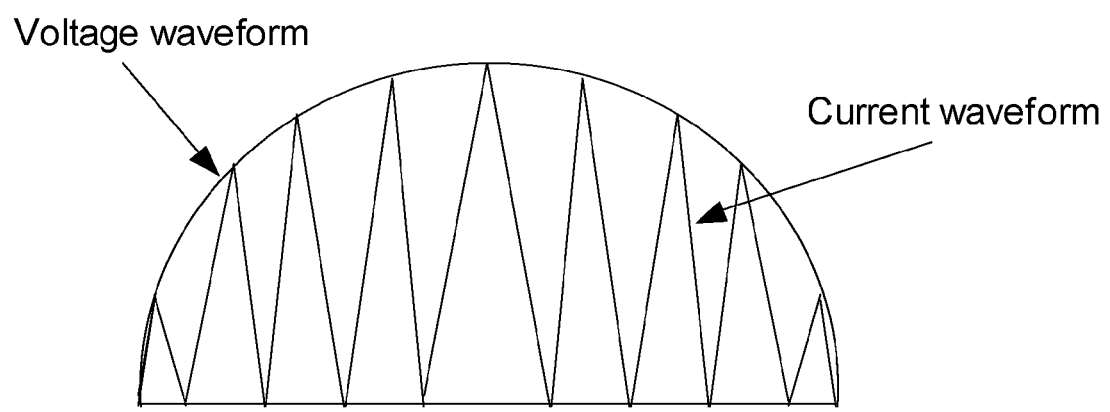
FIG. 3B illustrates the voltage waveform and current waveform of a conventional boost converter in critical mode.
Figure 4:
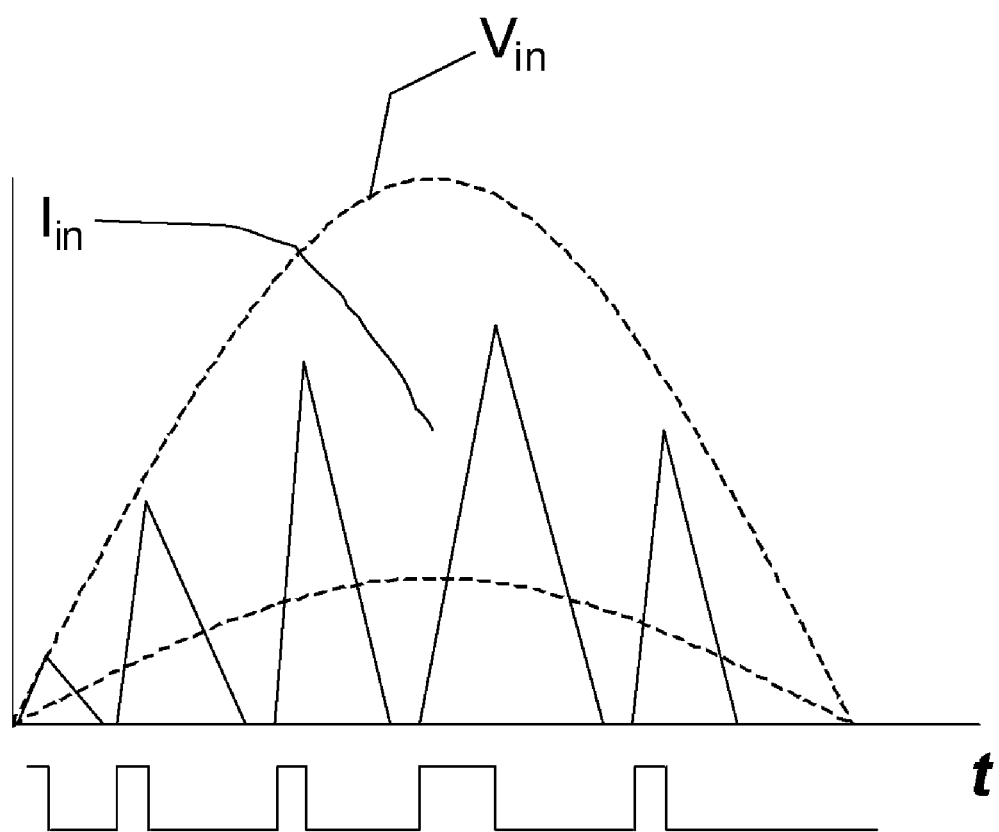
FIG. 4 illustrates the voltage waveform and current waveform of a conventional boost converter for discontinuous mode.

The controller 900 comprises most of the blocks of the controller 200 shown in FIG. 2A, including a subtractor 901, a multiplier 903, a subtractor 906, and a current amplifier 907. Similar reference numbers are used to indicate functionally similar blocks.

As shown, two A/D converters 909 and 916 convert analog signals for digital domain processing. A rectifier 905 rectifies the input voltage $V_{in}$. A zero crossing detector 914 determines the zero crossing points in the rectified input voltage $V_{inrec}$. A period estimator and phase generator 915 determines the period of the rectified input voltage $V_{inrec}$ and the phase θ of an instant point of $V_{inrec}$. A sine wave of θ is created and provided to the multiplier 903.

A sine wave and a cosine wave of integral times of θ are created and provided to a digital notch filter 910 so as to remove harmonic ripples in the output voltage $V_{out}$. In this embodiment, a sine wave and a cosine wave of 2θ are provided to the notch filter 910. A voltage range estimator 913 provides the voltage range of the rectified input voltage $V_{inrec}$ to a gain selector 912. A detector 911 detects over-voltage and under-voltage in the voltage error $V_{err}$ and provides such information to the gain selector 912. The gain selector 912 then determines the gain of a loop filter 902, which is also a voltage amplifier, to provide over-voltage protection.

The voltage error $V_{err}$ from the subtractor 901 is sampled by the A/D converter 909, filtered by the notch filter 910, and amplified by the loop filter 902 according to the gain from the gain selector 912. The phase θ, its sine wave, and the amplified $V_{err}$ ($V_{eaout}$) are multiplied to generate a factor $C_{ref}$. A subtractor 906 subtracts the factor $C_{ref}$ from the sampled input current $I_{1n}$, obtaining a current error $C_{err}$. The current amplifier 907 provides $C_{eaout}$, amplified current error $C_{err}$, to a PWM controller 908. The PWM controller 908 then generates a voltage pulse to control the switch 103 shown in FIG. 1 according to signals from the current amplifier 907, a zero current detector 917 and an over current detector 918. When the current exceeds the over current limit, the over current detector 918 opens the switch.

The multiple mode controller shown in FIG. 9A combines the average current mode and the critical mode. The charge time of the multiple mode controller is the same as that of the average current mode. The normal period for charging and discharging the boost inductor 104 in mixed mode, $T_s$, is also the same as that of the average current mode. The controller 900 adjusts the operating mode by controlling the start of the recharging. When a zero current is detected before $T_s$ expires, the controller 900 changes the operating mode to critical mode by closing the boost switch 103 to start recharging of the boost inductor. Otherwise, the boost converter continues to operate in the average current mode by starting recharging of the boost inductor after $T_s$ expires.

Figure 9B:
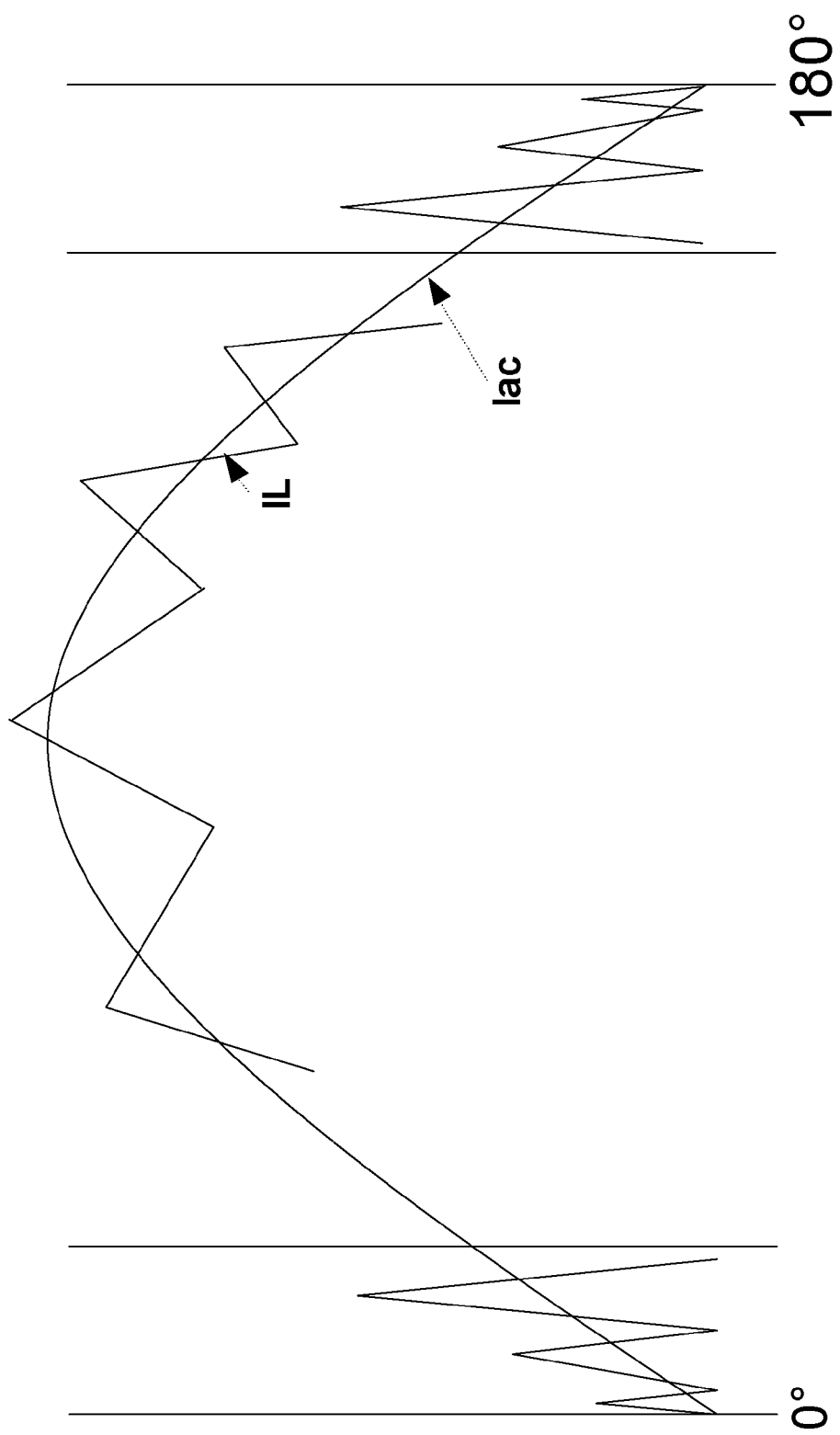
FIG. 9B illustrates the voltage waveform and current waveform of a boost converter employing the multiple mode controller shown in FIG. 8A.

FIG. 9B illustrates the voltage waveform and current waveform of a boost converter employing the multiple mode controller shown in FIG. 9A. As shown, when the phase of the input voltage is close to 0° or 180°, the loading is relatively low, the boost converter operates in critical mode. When the phase of the input voltage is close to 90°, the loading is relatively high, the boost converter operates in average current mode.

Figure 10:
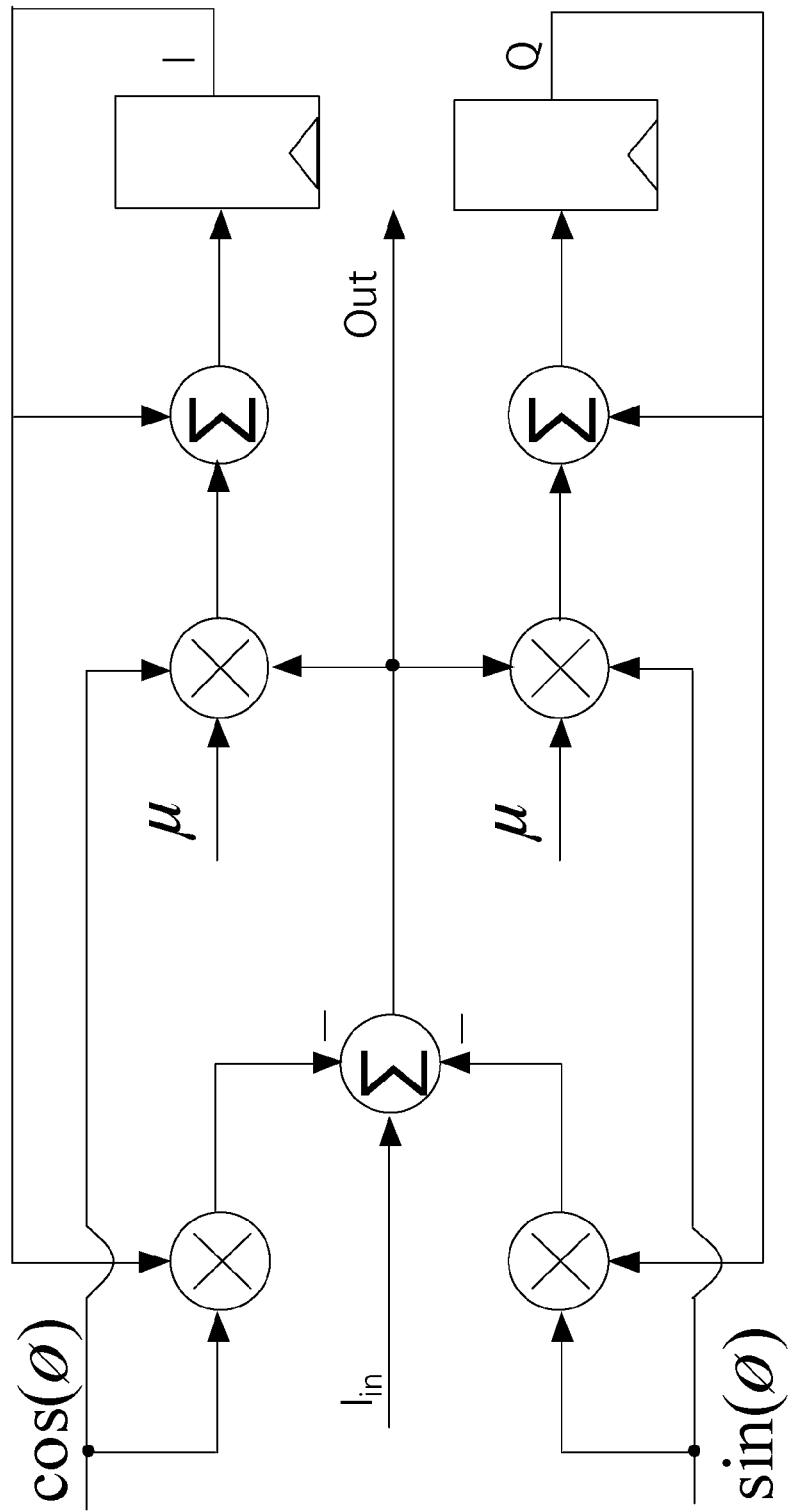
FIG. 10 shows a block diagram of a single-tone notch filter according to one embodiment of the present invention.

The notch filter 910 could be single tone or multi-tone. FIG. 10 shows a block diagram of a single-tone notch filter according to one embodiment of the present invention, wherein is the phase of the second harmonic of the rectified input voltage $V_{inrec}$, and μ represents bandwidth selection or step size of the adapter. The notch filter removes the harmonic ripples by operations to the sine wave and cosine wave of the phase of the harmonic. When the frequency of the input is 60 Hz, the digital notch filter can be configured to remove harmonic ripples of 120 Hz, 180 Hz and so on.

According to one embodiment of the invention, the overcurrent protection described above with reference to the controllers of FIG. 6 or FIG. 9A may be adaptive. In this embodiment, the current limit feature may detect the input voltage level (for any range of inputs), and may select the overcurrent threshold accordingly for an almost constant power level. In one aspect, a soft start scheme may be provided during start up to aid in preventing over current, without requiring a specific current limit scheme during start up.

This adaptive feature self adjusts a gate driver current source and slew rate based on the gate input capacitor of the boost transistor or boost switch (which may be a MOSFET). To avoid harmful over charge of the gate capacitor, calibration of the PWM pulse in the PWM controller 908 of FIG. 9A may be synchronized with the end of the soft start and the zero crossing of the line cycle. Providing an adaptive slew rate of the gate PWM also can reduce an electromagnetic interference (EMI) effect of the switching current spikes and can increase system efficiency.

In one embodiment, the adaptive over current (current limit) protection works by detecting the voltage level of the universal input voltage and self adjusting the overcurrent reference level to provide an almost constant power. An input voltage monitor may provide multi-level overcurrent protection. The function also serves to differentiate between an 110 Vrms input voltage and a 220 Vrms input voltage system. For example, to achieve a constant power limitation, in a 220 Vrms system the over current threshold should be almost half that of the 110 Vrms system. A single comparator with multi-level adjustable references may be used to detect an input voltage level and adjust the over current protection (OCP) accordingly.

For a higher level of input voltage detection, the over current threshold may be stepped down to lower the current limit level. At start up, the current limitation may be fixed on the lowest level related to the low input voltage (e.g. 108 Vrms).

A sequence of normal regulation and adaptive driver gate charge evaluation, or GCE, now will be described.

After $V_o > 87.5\% \ V_{o\text{-}rated}$, normal regulation should start. For the first power-on after each reset, an adaptive driver block will perform a GCE process for a short period in the neighborhood of the line voltage zero crossing, and will determine a number of pre-driver arrays required for a given power MOSFET. To activate GCE, three conditions should be present:
1) $V_{FB} > 87.5\%$ rated
2) Signal Clk 21=1
3) Signal "Evaldone"=0

Once the GCE takes place the "Evaldone" signal remains high, and GCE will not repeat except after reset. When "Evaldone"=1, normal regulation starts and operation continues based on the selected normal mode operation, Average Current (or continuous) Mode or Mixed Mode. If at any time during operation, overvoltage or overcurrent protection or any other fault condition occurs, as shown in the state diagram of FIG. 11, the operation will roll back to an appropriate state.

Figure 11:
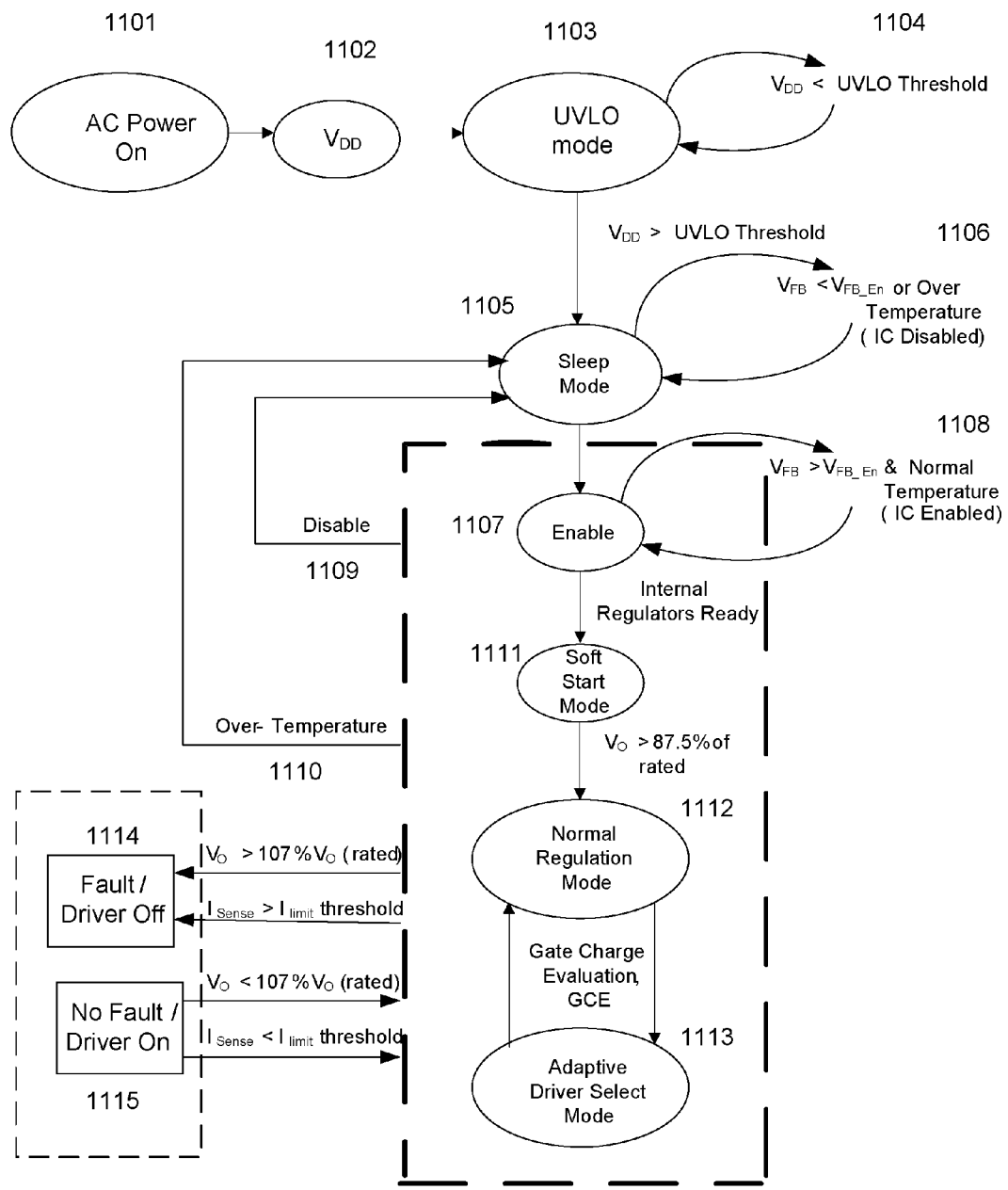
FIG. 11 is a state diagram depicting a sequence of power-on and normal operation according to one embodiment of the present invention.

Looking now at FIG. 11, AC power on occurs at 1101. Vdd is monitored at 1102. Comparison of Vdd to an undervoltage lockout (UVLO) threshold occurs at 1103 and 1104. So long as Vdd is below that threshold, the system remains in UVLO mode.

After Vdd exceeds the UVLO threshold, at 1105 the system enters a sleep mode, an intermediate state in which some functions are active but other functions are turned off. Sleep mode comes after Vdd12>8V when the UVLO signal is pulled low. In this low consumption mode, the low power bandgap, shunt regulator, UVLO, and over temperature detection circuits are active. This mode will persist until the Enable signal "En" goes high, at which point the system goes to 1107 in FIG. 11. Vo>10% gives En=1 and Vo<8% gives En=0.

The Enable state will persist according to 1108. From any other mode in which the "En" signal is pulled low, or the over temperature fault signal goes high (Tov=1), the state machine rolls back to the low consumption sleep mode, per 1109 and 1110.

A soft start mode begins at 1111. At every start up the PFC load is seen as a short circuit because of the output capacitor's low impedance. The soft start mode controls a slew rate of output voltage buildup in a controlled manner. At beginning of this mode that oscillator, ADC, DSP core and one branch of pre-drivers are active for some fixed number of gating pulses of a minimum duty cycle (D≈6%) to start the switching. This arbitrary switching helps to avoid the zero crossing distortion of the input voltage divider because of a rectifier parasitic effect that could disturb zero crossing detection and the start up process (specifically in high input voltage situations, for example, Vin>250 Vrms). Soon after the internal signal confirms that the input is present then the soft start mode continues until the output voltage FB is above 87.5% of the rated value ($V_o > 87.5\% \ V_{o\text{-}rated}$). At this point, the system enters normal regulation mode at 1112, and GCE is performed at 1113 according to conditions described above. Thereafter, operation continues at 1112 based on the selected mode of operation.

During the boost output voltage ramp up, to enable smooth charging of the output capacitor and to fulfill the requirements of the load type (e.g.; flyback or LED driver applications of the IC), a selectable multi level soft start mode may be activated by codes. When the output voltage exceeds the Standby threshold (>10% of rated output), the soft start mode may be activated until the voltage reaches about 87.5% $V_{o\text{-}rated}$ (equivalent to the scaled down Feed Back voltage of 2.5*87.5%=2.18 V at IC pin "FB"). In one embodiment, the soft start mode can be controlled by registers, for example, in a DSP such as DSP 613 in FIG. 6. The slope of start up may be controlled by the user with a predefined external resistor connected to ground.

If, during normal operation, the output voltage for any reason drops below 10% of rated output, the state machine switches back to the Standby state and Soft Start Mode would repeat again. During the soft start, regardless of the input voltage range detection, the lowest threshold of the current limitation related to the minimum input voltage is selected.

In addition, in an overvoltage or overcurrent condition (for example, Vo>107% of the rated voltage, or any other desired threshold setting, as may be detected by overvoltage detector 911 in FIG. 9A) or Isense>Ilimit, the limiting current threshold which also may be set as desired, and as may be detected for example by overcurrent detector 918 in FIG. 9A), a fault may be triggered, as at 1114 in FIG. 11, and the driver of the boost switch turned off. When the overvoltage and/or overcurrent conditions end, the fault condition may end and the driver of the boost switch may be turned on again, as at 1115.

Figure 5:
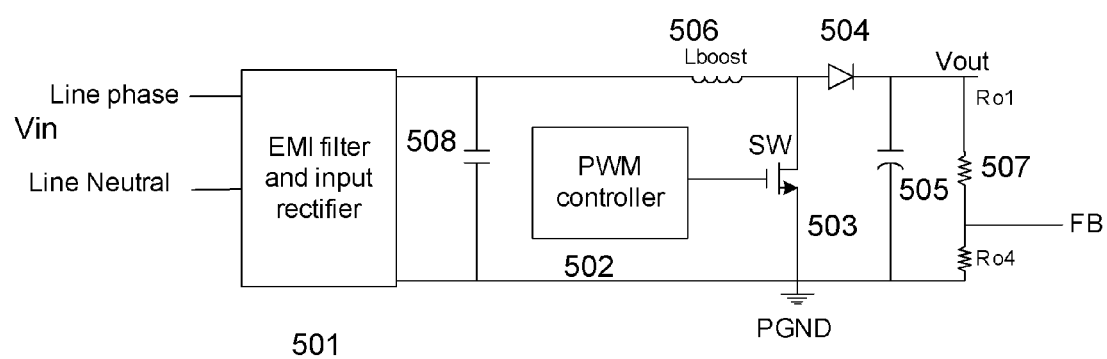
FIG. 5 illustrates a block diagram of an existing PFC controller.

The present invention also provides an adaptive driver for a PFC controller, so as to create an almost constant di/dt or slew rate over the boost switch 503 in FIG. 5, or the boost switches in FIG. 6 or 9A. For convenience, in the following discussion, reference will be made to boost switch 503 in FIG. 5, it being readily understood by ordinarily skilled artisans that the discussion applies equally to the boost switches in FIGS. 6 and 9A.

The adaptive driver may have a group of transistors which may be divided into a plurality of branches. Each branch may have a PMOSFET for charging the boost switch and an NMOSFET for discharging the boost switch. The charging current through the boost switch 503 may be increased by turning on an increasing number of branches until the voltage over the boost switch 503 exceeds a reference voltage, and this may determine the number of branches to drive the boost switch during normal operation.

Figure 12:
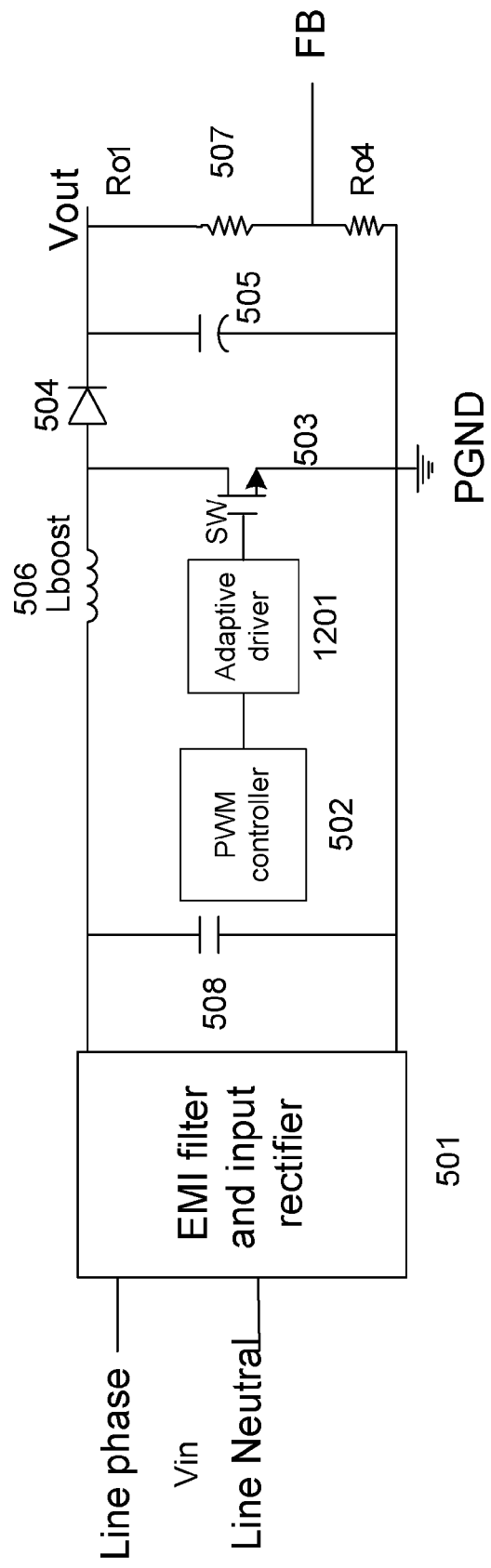
FIG. 12 illustrates a block diagram of a PFC controller according to one embodiment of the present invention.

FIG. 12 illustrates a PFC controller according to one embodiment of the present invention. As shown, an adaptive driver 1201 may be used to control the gate current of the boost switch 503. Although the adaptive driver 1201 is added between the PWM controller 502 and the boost switch 503 in FIG. 12, it should be understood that the adaptive driver 1201 may be added at the other side of the PWM controller 502, or may be integrated as a part of the PWM controller. Thus, the output of either the PWM controller 502 or the adaptive driver may be used to control the boost switch.

Figure 13:
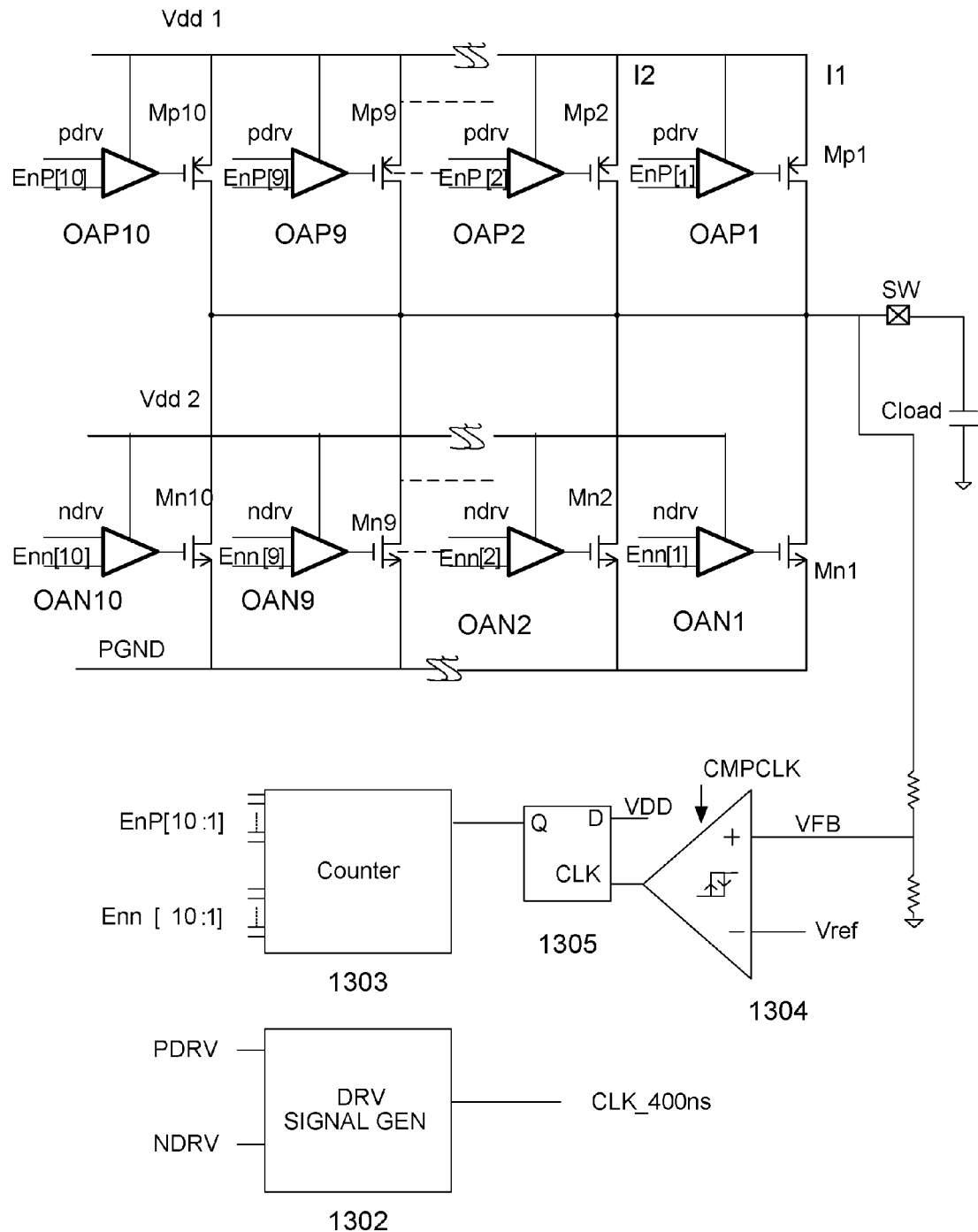
FIG. 13 illustrates an adaptive driver for a PFC controller according to one embodiment of the present invention.

FIG. 13 illustrates an adaptive driver for a PFC controller according to one embodiment of the present invention. As shown, the adaptive driver may have a group of power transistors 1301, a driving signal generator 1302, a counter 1303, and a comparator 1304.

The group of power transistors 1301 may be divided into a plurality of branches, each of which may have a PMOSFET and a NMOSFET. In the embodiment shown in FIG. 13, the group of power transistors may have 10 branches, the first branch may have a PMOSFET Mp1 and a NMOSFET Mn1, the second branch may have a PMOSFET Mp2 and a NMOSFET Mn2, . . . and the tenth branch may have a PMOSFET Mp10 and a NMOSFET Mn10. It should be understood that the group 1301 may have more or fewer branches.

For the first branch, the source of Mp1 may be coupled to a voltage $V_{dd}$, and the gate of Mp1 may be driven by the output of an operational amplifier OAP1. The non-inverting input of OAP1 may receive a driving signal PDRV from a driving signal generator 1302, and the inverting input of OAP1 may receive an enabling signal EnP[10:1] from the counter 1303. As will be discussed below, the current passing through Mp1 may be used to charge the gate capacitor of the boost switch 503, e.g., $C_{load}$, during an evaluation period, so as to decide how many branches should be switched on to drive the boost switch 503 in normal operation.

The drain of Mn1 may be coupled to the drain of Mp1, and the gate of Mn1 may be driven by the output of an operational amplifier OAN1. The non-inverting input of OAN1 may receive a driving signal NDRV from the driving signal generator 1302, and the inverting input of OAN1 may receive an enabling signal Enn[10:1] from the counter 1303. As will be discussed below, Mn1 may be used to discharge the $C_{load}$ during the evaluation period.

Figure 15:
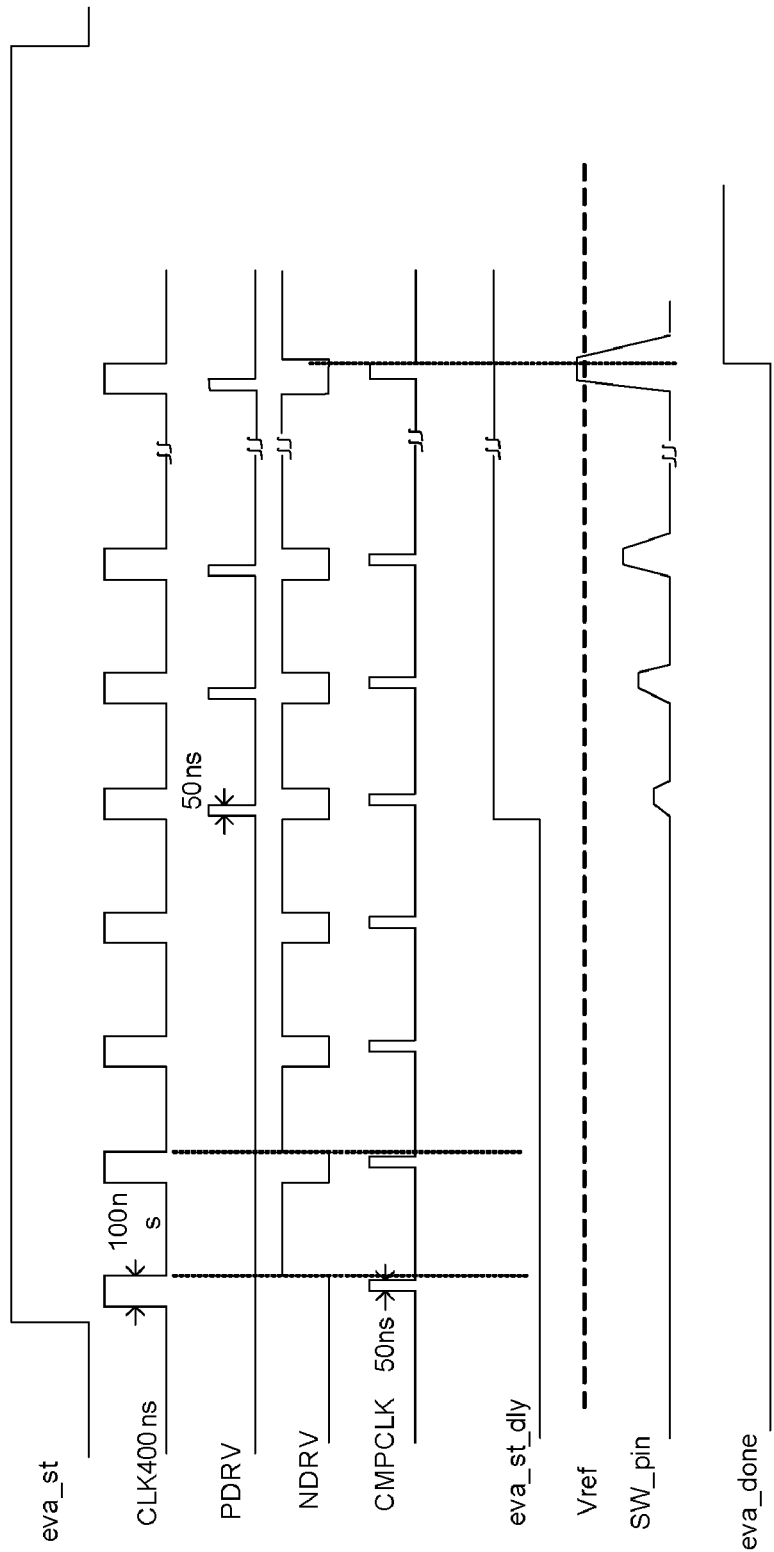
FIG. 15 illustrates waveforms of signals in an adaptive driver for a PFC controller according to one embodiment of the present invention.

The driving signal generator 1302 may be used to generate a PDRV signal for the PMOSFETs and an NDRV signal for the NMOSFETs. The driving signal generator 1302 may receive a clock signal. In one embodiment, the clock signal may be CLK_400 ns whose period is 400 ns and pulse duration is 100 ns, as shown in FIG. 15. The driving signal generator may output the PDRV signal to each of the PMOSFETs and the NDRV signal to each of the NMOSFETs. As shown in FIG. 15, the PDRV signal's period may be 400 ns, the same as the clock signal. The pulse duration of the PDRV signal may be 50 ns and its rising edge may be synchronized with the rising edge of the clock pulse. The NDRV signal's period may also be 400 ns. The pulse duration of the NDRV signal may be 300 ns, its rising edge may be synchronized with the falling edge of the clock pulse and its falling edge may be synchronized with the rising edge of the clock pulse.

The counter 1303 and the driving signal generator 1302 may receive the same clock signal, e.g., CLK_400 ns. The counter 1303 may provide an enabling signal EnP[n:m] to one or more of the PMOSFETs and Enn[n:m] to one or more of the NMOSFET(s), wherein n is the total number of the branches, and m is the current counter value which is also the number of PMOSFETs/NMOSFETs to be turned on during a clock pulse. As shown in FIG. 15, when n=10 and m=1, the counter 1303 may generate a signal Enp[10:1] to enable OAP1, so that $C_{load}$ may be charged via Mp1 during the 50 ns pulse duration of the PDRV signal. The counter 1303 may also generate a signal Enn[10:1] to enable OAN1 to discharge $C_{load}$ via Mn1 during the 300 ns pulse duration of NDRV signal. During the next clock pulse, if the counter value m is increased to 2, the counter 1303 may generate a signal Enp[10:2] to enable OAP1 and OAP2, so that $C_{load}$ may be charged via Mp1 and Mp2 during the 50 ns pulse duration of the PDRV signal. The counter 1303 may also generate a signal Enn[10:2] to enable OAN1 and OAN2 to discharge $C_{load}$ via Mn1 and Mn2 during the 300 ns pulse duration of NDRV signal. The counter 1303 may continue to increase the value of m until it is stopped by a signal from a flip-flop 1305. In one embodiment, the counter 1303 may be a 4 bit counter. In one embodiment, the counter may have 2n output pins, each of which may be coupled to one of the PMOSFETs and NMOSFETs.

A comparator 1304 may compare the voltage over the boost switch 503, VFB, with a reference voltage $V_{ref}$ during the evaluation period. In one embodiment, the comparator 1304 may be a high speed latched comparator operating at 40 MHz. The comparator 1304 may receive the VFB at one input, the $V_{ref}$ at another input and a CMP_CLK signal at its positive power supply pin. When VFB is higher than $V_{ref}$ at the end of a time pulse, the comparator may output a high signal to trigger the flip-flop 1305, which may then output a high signal to stop the counter 1303 from increasing the value of m. In one embodiment, $V_{ref}$ may be selected to keep the PMOSFETs operating at saturated state. In one embodiment, $V_{ref}$ may be 6V.

Figure 14:
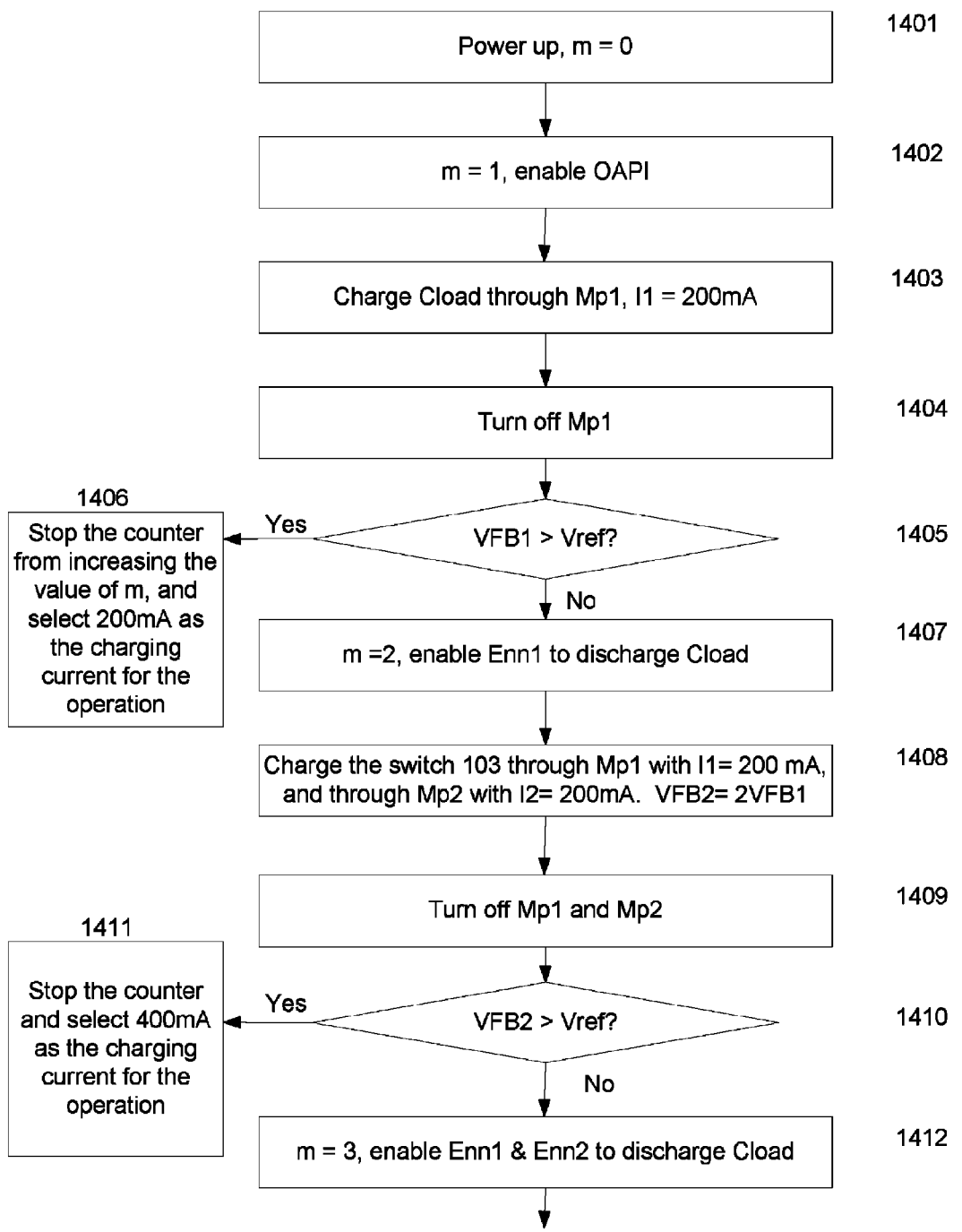
FIG. 14 illustrates a flowchart of the operation of an adaptive driver for a PFC controller according to one embodiment of the present invention.

FIG. 14 illustrates a flow chart of the operation of an adaptive driver for a PFC controller according to one embodiment of the present application.

At 1401, the PFC controller may be powered up and the evaluation period may begin shortly after. The driving signal generator 1302 and the counter 1303 may start to operate based upon the clock signal, e.g., CLK_400 ns, and the value m of the counter 1303 may be set to 0. In one embodiment, the counter 1303 and the driving signal generator 1302 may be controlled or programmed to hold up their operation for, e.g., 4 clock pulses, so as to wait for the power supply to become stable.

At 1402, the rising edge of the 5th clock pulse may trigger the driving signal generator 1302 to output the PDRV signal, and may trigger the counter 1303 to increase the value of m from 0 to 1 to start the first phase of the evaluation. Consequently, the counter 1303 may generate a signal EnP[10:1] to enable OAP1.

At 1403, the OAP1 may receive the enabling signal. The branch having OAP1 may be turned on for 50 ns and $I_1$ may then pass through Mp1 to feed into the gate of the boost switch 503. In one embodiment, $I_1$ may be 200 mA. As described above, the boost switch 503 may be a NMOSFET and may appear as a gate capacitor in FIG. 13. During the 50 ns pulse duration of the PDRV signal, because of the gate capacitance $C_{load}$ of the boost switch 503, the voltage at the SW pin may be driven up as follows:

$$dV = I_1 * \frac{dt}{C_{load}}, \text{ or}$$

$$\frac{dV}{dt} = \frac{I_1}{C_{load}}$$

wherein $I_1$ is the charging current, dt is the charging time and $C_{load}$ is the gate capacitance of the boost switch 503. Since both $I_1$ and $C_{load}$ are constants, dV/dt is a constant, and di/dt is a constant as well.

At 1404, the falling edge of the PDRV signal may turn off OAP1, and consequently Mp1, for 50 ns. The SW pin voltage at that point, VFB1, may be held there for 50 ns, so that the comparator 1304 may compare VFB1 with the reference voltage $V_{ref}$ at 1405.

If VFB is higher than $V_{ref}$ at 1406, the falling edge of the CMPCLK may trigger an eva_done signal and the output of the comparator 1304 may become high. The output of the flip flop 1305 may then become high and stop the counter 1303 from increasing the value of m and the normal operation of the PFC controller may begin. The 200 mA current may be selected as a default charging current for normal operation of the PFC controller.

Until the power is turned off, the value of m may be kept as 1 and only OAP1 may be enabled. $I_1$ may flow through Mp1 to charge the boost switch 503. Since dV=VFB=$V_{ref}$, dt=50 ns, $I_1$=200 mA and $C_{load}$ is a constant, the whole system is very stable and the slew rate of voltage and current at the boost switch 503 may remain constant. If the power is turned off and turned on again, a new evaluation period may be started to decide how many branches should be turned on.

It should be understood that 1404 is optional. In another embodiment, instead of waiting for the falling edge of the clock signal, the comparator may monitor the SW pin voltage constantly, and will trigger the eva_done signal as soon as the SW pin voltage exceeds $V_{ref}$.

If VFB does not exceed $V_{ref}$ at 1407, the output of the comparator 1304 and the flip flop 1305 may not change, and the counter 1303 may increase the value of m to 2 to start the second phase of the evaluation. At the same time, Enn1 may be turned on by the rising edge of the NDRV signal to fully discharge the $C_{load}$ to prepare for the second phase.

At 1408, the counter 1303 may send enable signals EnP [10:2] to OAP1 and OAP2. The first and second branches of the power transistor group may be turned on for 50 ns. $I_1$ may then pass through OAP1 to charge the $C_{load}$ and $I_2$ may pass through OAP2 to charge the $C_{load}$. Since Mp1 and Mp2 may be similar transistors and both coupled to Vdd, $I_2$=$I_1$=200 mA. Consequently, 400 mA may be fed to $C_{load}$ and the voltage at the SW pin may be driven up to VFB2. Since the charging current is 2 times of the charging current in the first phase, VFB2=2 VFB1.

At 1409, the falling edge of the PDRV signal may turn off OAP1 and OAP2, and consequently Mp1 and Mp2, for 50 ns. The SW pin voltage at that point, VFB2, may be held for 50 ns.

At 1410, the comparator 1304 may compare VFB2 with the reference voltage $V_{ref}$.

If VFB2 is higher than $V_{ref}$ at 411, a falling edge of the CMPCLK may trigger an eva_done signal to stop the counter 1303 from increasing the value of m. The normal operation of the PFC controller may start, and the 400 mA current may be selected as a default charging current for the whole operation period of the PFC controller.

If VFB2 does not exceed $V_{ref}$ at 1412, the output of the comparator 304 may become high, which triggers the flip flop 1305. The flip-flop 1305 may then trigger the counter 1303 to increase the value of m to 3 to start the third phase of the evaluation. At the same time, Enn1 and Enn2 may be turned on by the rising edge of the NDRV signal to fully discharge $C_{load}$ to prepare for the third phase.

The charge-discharge cycle may repeat until the VFB exceeds the $V_{ref}$ and the current charging $C_{load}$ in that phase of evaluation period may be selected as the default charging current for the normal operation of PFC controller.

Figure 16A:
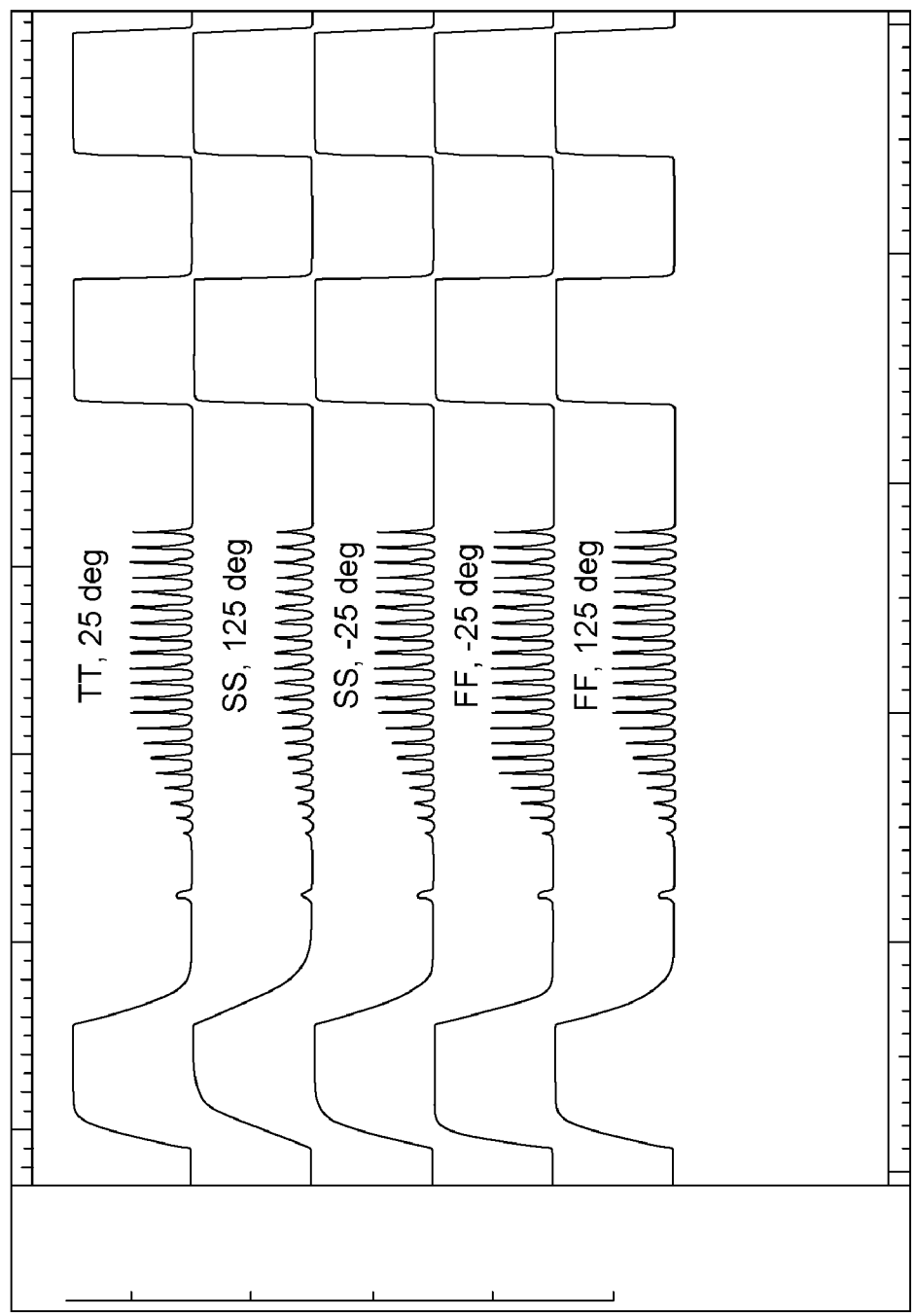
FIGS. 16A, 16B and 16C illustrate simulation results of the SW pin slew rates in a PFC controller with an adaptive driver according to one embodiment of the present invention.
Figure 16B:
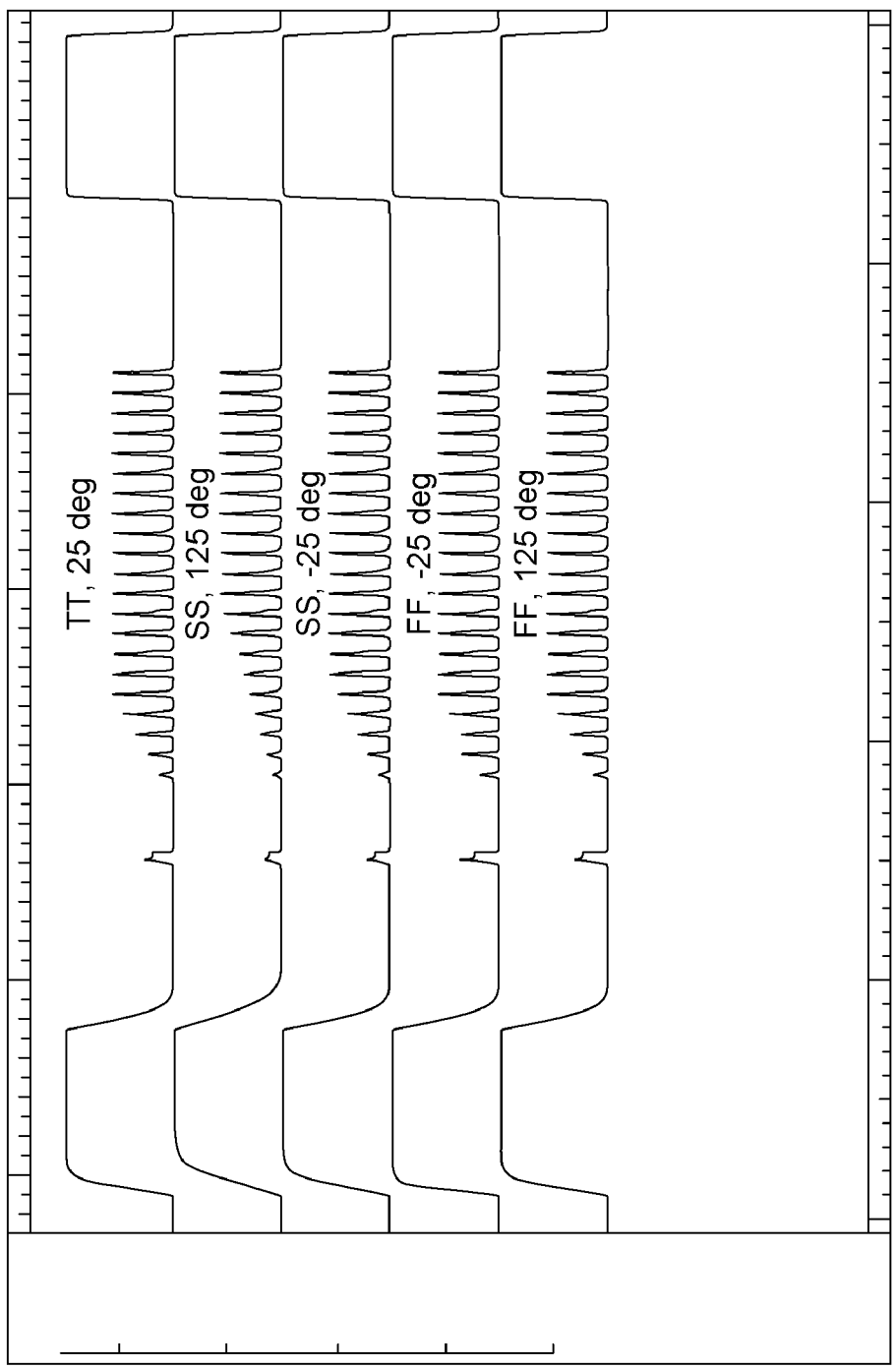
Figure 16C:
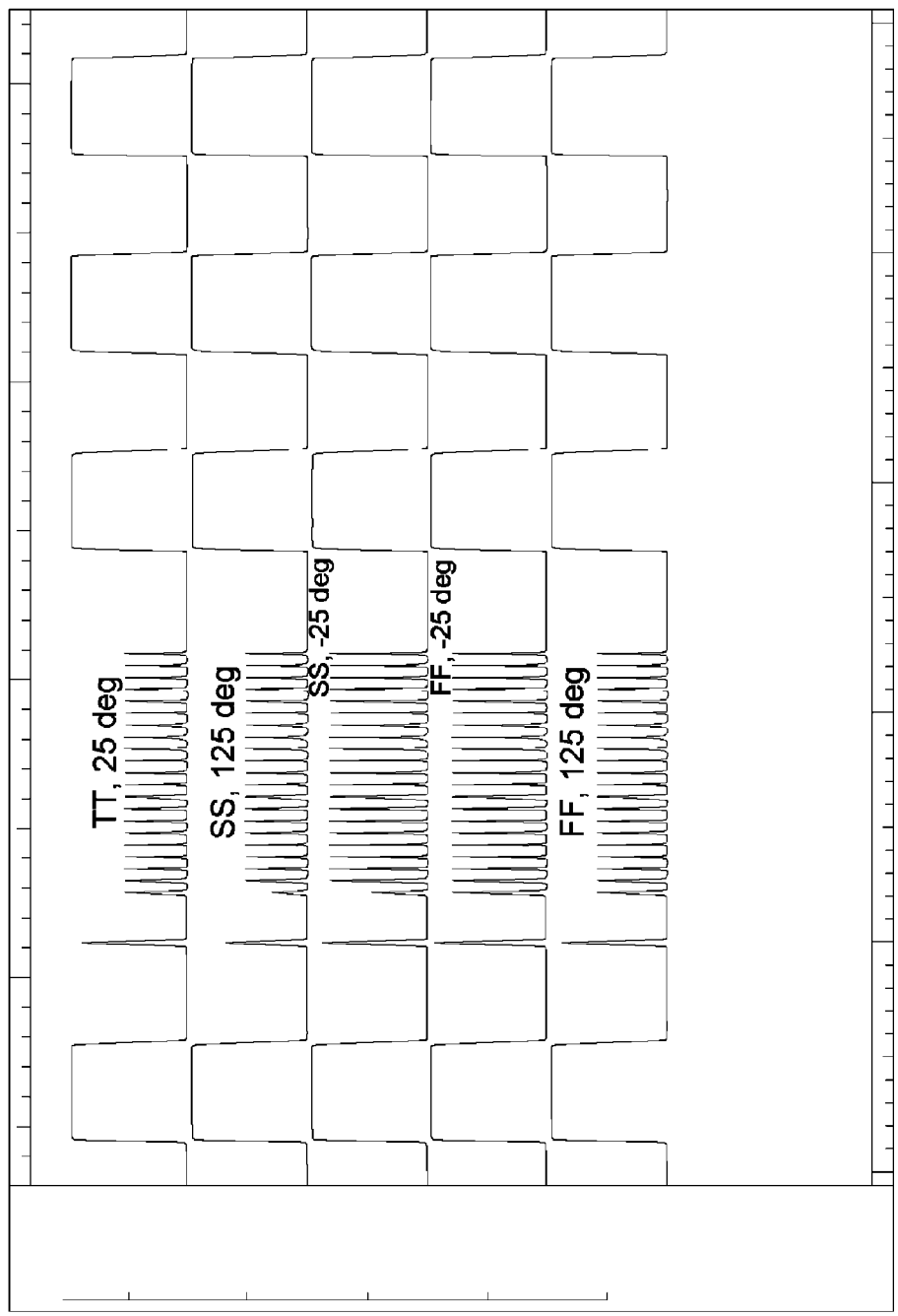

With the adaptive driver 1201, the slew rate at the SW pin may remain constant over varying $C_{load}$ and varying operating conditions. FIGS. 16A, 16B and 16C illustrate simulation results of the SW pin slew rates in a PFC controller with an adaptive driver according to one embodiment of the present invention. As shown, the operating conditions may include temperature and process corners. Simulations are done for temperatures −25° C., 25° C. and 125° C. and for process corners very low (SS), normal (TT) and fast (FF)

As shown in FIG. 16A and summarized in Table 1, when $C_{load}$=10 nF, the number of turned on branches may change from 6 to 10 and the slew rates may remain between 0.12 V/ns and 0.15 V/ns.

TABLE 1

|  | TT, 25 deg | SS, 125 deg | SS, −25 deg | FF, −25 deg | FF, 125 deg |
| --- | --- | --- | --- | --- | --- |
| Arrays used | 9 | 10 | 10 | 6 | 9 |
| Slew rate | 0.15v/ns | 0.13V/ns | 0.12V/ns | 0.14V/ns | 0.15V/ns |

As shown in FIG. 16B and summarized in Table 2, when $C_{load}$=5 nF, the number of turned on branches may change from 3 to 10 and the slew rates may remain between 0.15 V/ns and 0.17 V/ns.

TABLE 2

|  | TT, 25 deg | SS, 125 deg | SS, −25 deg | FF, −25 deg | FF, 125 deg |
| --- | --- | --- | --- | --- | --- |
| Arrays used | 5 | 10 | 6 | 3 | 5 |
| Slew rate | 0.17V/ns | 0.16V/ns | 0.16V/ns | 0.16V/ns | 0.15V/ns |

As shown in FIG. 16C and summarized in Table 3, when $C_{load}$=1 nF, the number of turned on branches may change from 1 to 2 and the slew rates may remain between 0.14 V/ns and 0.28 V/ns.

TABLE 3

|  | TT, 25 deg | SS, 125 deg | SS, −25 deg | FF, −25 deg | FF, 125 deg |
| --- | --- | --- | --- | --- | --- |
| Arrays used | 1 | 2 | 2 | 1 | 1 |
| Slew rate | 0.28V/ns | 0.24V/ns | 0.22V/ns | 0.21V/ns | 0.14V/ns |

The method and apparatus of the present invention can be used in any power supply. While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. In a power factor correction controller comprising a boost switch, an adaptive driver comprising:
   a first branch of transistors, comprising a first transistor for charging a gate capacitor of said boost switch in said power factor correction controller during an evaluation period;
   a second branch of transistors, comprising a second transistor for charging the gate capacitor of the boost switch during the evaluation period; and
   a counter to provide an indication to turn on the first branch, and to indicate whether to turn on the second branch to charge the gate capacitor during the evaluation period if a voltage over the boost switch does not exceed a reference voltage, so as to control a slew rate and an amount of a charging current of the boost switch during normal operation.

2. The adaptive driver of claim 1, further comprising a comparator, receiving the voltage over the boost switch, comparing the voltage over the boost switch with the reference voltage, and stopping the counter from incrementing when the voltage over the boost switch exceeds the reference voltage so as to select the charging current of the boost switch.

3. The adaptive driver of claim 2, further comprising a flip-flop coupled between the comparator and the counter and triggering the counter to stop increasing its value in response to an output of the comparator.

4. The adaptive driver of claim 1, further comprising a driving signal generator controlling the first transistor.

5. The adaptive driver of claim 4, further comprising an operational amplifier which receives signals from the counter and the driving signal generator and outputs a signal to turn on one of the first transistor or the second transistor.

6. The adaptive driver of claim 4, wherein the first branch further comprises a third transistor, controlled by the counter and the driving signal generator, for discharging the boost switch.

7. The adaptive driver of claim 5, wherein the second branch further comprises a fourth transistor for discharging the boost switch.

8. The adaptive driver of claim 7, further comprising an operational amplifier which receives signals from the counter and the driving signal generator and outputs a signal to turn on the fourth transistor.

9. A power factor correction controller comprising the adaptive driver of claim 1.

10. A method comprising:
    charging a gate capacitor of a boost switch in a power factor correction controller during an evaluation period using a first transistor in a first transistor branch;
    comparing a voltage over the boost switch with a reference voltage at a comparator during the evaluation period; and
    further charging the gate capacitor of the boost switch with a second transistor in a second transistor branch during the evaluation period unless the voltage over the boost switch exceeds the reference voltage; and
    controlling a slew rate and an amount of a charging current of the boost switch during normal operation in accordance with the charging, comparing, and further charging.

11. The method of claim 10, further comprising: incrementing a counter when the voltage over the boost switch does not exceed the reference voltage.

12. The method of claim 11, further comprising: generating a driving signal to turn on the second transistor in the second transistor branch when the voltage over the boost switch does not exceed the reference voltage.

13. The method of claim 11, further comprising: sending a signal from the comparator to the counter to stop it from incrementing when the voltage over the boost switch exceeds the reference voltage.

14. The method of claim 11, further comprising: responsive to the incrementing of the counter, receiving an enabling signal from the counter and a driving signal from a driving signal generator at an operational amplifier to turn on the second transistor in the second transistor branch during the evaluation period.

15. The method of claim 10, further comprising: discharging the gate capacitor of the boost switch via a third transistor in the first branch.

16. The method of claim 10, further comprising: selecting the reference voltage to enable the first transistor to work in a saturated state.

17. The method of claim 10, further comprising: generating a signal indicating the end of the evaluation period.

18. The method of claim 10, further comprising: delaying the start of the evaluation period for a number of clock pulses after the power factor controller is powered up.

19. The adaptive driver of claim 4, further comprising a further branch of transistors, comprising a further transistor for charging the gate capacitor of the boost switch during the evaluation period, wherein the counter indicates how many branches to turn on to charge the gate capacitor during the evaluation period, so as to control a slew rate and the amount of a charging current of the boost switch during normal operation.

20. The adaptive driver of claim 19, wherein the further branch of transistors also comprises an additional transistor for discharging the gate capacitor.

21. The adaptive driver of claim 7, wherein the fourth transistor is controlled by the counter and the driving signal generator.

22. The adaptive driver of claim 20, wherein the additional transistor is controlled by the counter and the driving signal generator.

23. The method of claim 14, further comprising: discharging the gate capacitor of the boost switch via a fourth transistor in the second branch.

24. The method of claim 10, further comprising: additionally charging the gate capacitor of the boost switch with a further transistor in a further transistor branch during the evaluation period unless the voltage over the boost switch exceeds the reference voltage; and
    controlling a slew rate and an amount of a charging current of the boost switch during normal operation in accordance with the charging, comparing, further charging, and additionally charging.

* * * * *